(12) United States Patent
Zhak et al.

(10) Patent No.: US 9,653,986 B2
(45) Date of Patent: May 16, 2017

(54) MULTI-LEVEL STEP-UP CONVERTER TOPOLOGIES, CONTROL AND SOFT START SYSTEMS AND METHODS

(71) Applicant: Maxim Integrated Products, Inc., San Jose, CA (US)

(72) Inventors: Serhii Mikhailovich Zhak, North Andover, MA (US); Mark Anthony Belch, Chandler, AZ (US); Brett A. Miwa, Wellesley, MA (US); David Harrington, North Chelmsford, MA (US); Jonathan King, Brookline, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 132 days.

(21) Appl. No.: 14/212,062

(22) Filed: Mar. 14, 2014

(65) Prior Publication Data

US 2014/0266135 A1 Sep. 18, 2014

Related U.S. Application Data

(60) Provisional application No. 61/787,557, filed on Mar. 15, 2013.

(51) Int. Cl.
*H02M 1/36* (2007.01)
*H02M 3/158* (2006.01)
*H02M 7/483* (2007.01)

(52) U.S. Cl.
CPC .............. *H02M 1/36* (2013.01); *H02M 3/158* (2013.01); *H02M 7/483* (2013.01)

(58) Field of Classification Search
CPC ......... H02M 1/36; H02M 3/158; H02M 7/483
See application file for complete search history.

(56) References Cited

U.S. PATENT DOCUMENTS

| 5,737,201 A | 4/1998 | Meynard et al. |
| 8,503,203 B1 * | 8/2013 | Szczeszynski ........ H02M 3/073 307/110 |

(Continued)

FOREIGN PATENT DOCUMENTS

WO    WO-02063757 A1    8/2002

OTHER PUBLICATIONS

U.S. Appl. No. 14/211,922, filed Mar. 14, 2014, Serhii Mikhailovich Zhak et al.

(Continued)

*Primary Examiner* — Jue Zhang
*Assistant Examiner* — Lakaisha Jackson

(57) ABSTRACT

A multi-level, step-up converter circuit includes an inductor including one terminal in communication with an input voltage supply. N transistor pairs are connected in series, where N is an integer greater than one. First and second transistors of a first pair of the N transistor pairs are connected together at a node. The node is in communication with another terminal of the inductor. Third and fourth transistors of a second pair of the N transistor pairs are connected to the first and second transistors, respectively. (N−1) capacitors have terminals connected between the N transistor pairs, respectively. An output capacitor has a terminal in communication with at least one transistor of the N transistor pair.

38 Claims, 18 Drawing Sheets

(56) References Cited

U.S. PATENT DOCUMENTS

| | | | |
|---|---|---|---|
| 2003/0001552 A1* | 1/2003 | Fujita | H02M 3/07 323/288 |
| 2008/0019068 A1* | 1/2008 | Reynolds | G06F 1/26 361/93.1 |
| 2009/0195068 A1* | 8/2009 | Ohashi | H03K 17/162 307/18 |
| 2010/0237833 A1* | 9/2010 | Abe | H02M 3/07 320/166 |
| 2011/0221415 A1 | 9/2011 | Otsuka et al. | |
| 2013/0119961 A1* | 5/2013 | Okuda | H02M 3/158 323/299 |
| 2014/0346962 A1* | 11/2014 | Sanders | H05B 33/0815 315/193 |
| 2015/0009734 A1* | 1/2015 | Stahl | H02M 7/53871 363/98 |
| 2015/0155712 A1* | 6/2015 | Mondal | H02J 3/1857 307/23 |
| 2015/0171763 A1* | 6/2015 | Kondo | H02M 1/32 363/37 |
| 2015/0249403 A1* | 9/2015 | Sato | H02M 7/537 363/127 |
| 2015/0280608 A1* | 10/2015 | Yoscovich | H02M 7/483 363/131 |
| 2015/0288335 A1 | 10/2015 | Hoyerby | |

OTHER PUBLICATIONS

G. Butti and J. Biela, "Novel High Efficiency Multilevel DC-DC Boost Converter Topologies and Modulation Strategies," Proceedings of the 2011-14th European Conference on Power Electronics and Applications (EPE 2011), 2011, pp. 1-10. (10 Pages).

Miaosen Shen, Fang Zheng Peng, and Leon M. Tolbert, "Multilevel DC-DC Power Conversion System With Multiple DC Sources," IEEE Transactions on Power Electronics, vol. 23 (1), 2008, pp. 420-426. (7 Pages).

A. Tomaszuk and A. Krupa, "High efficiency high step-up DC/DC converters—a review," Bulletin of the Polish Academy of Sciences, Technical Sciences vol. 59, No. 4, 2011, pp. 475-483. (9 Pages).

* cited by examiner

Flying capacitor charge balancing in CCM, D<50%

Flying capacitor charge balancing in CCM, D>50%

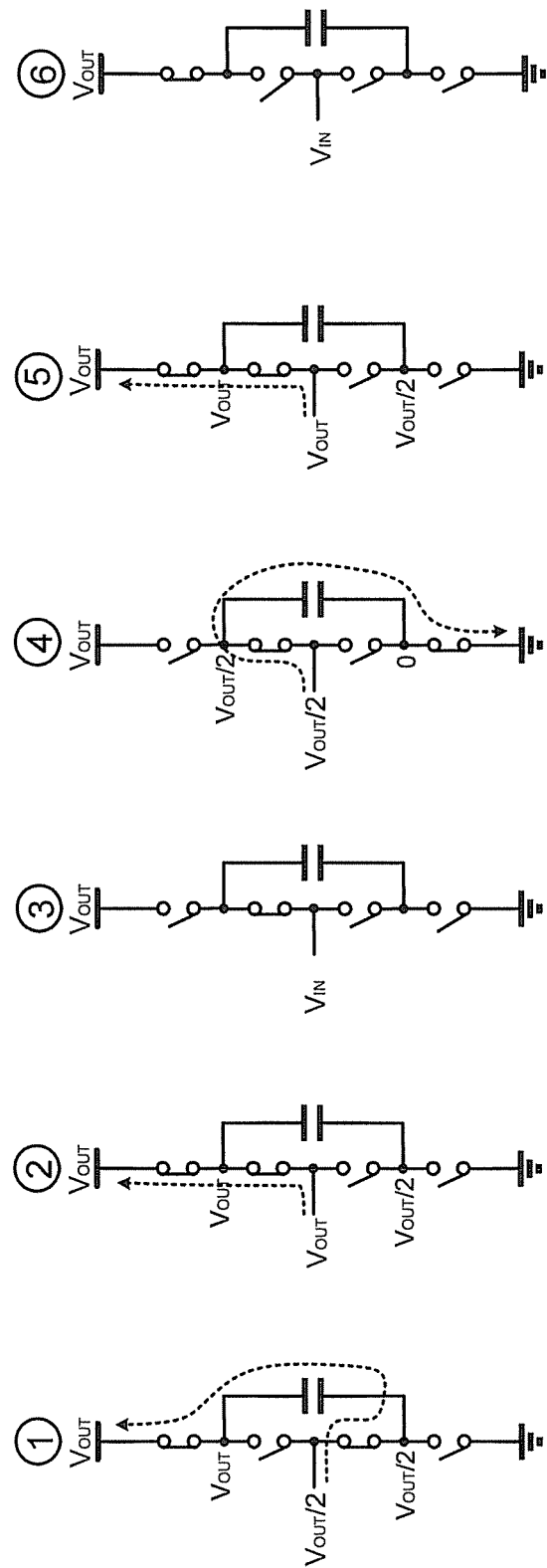
FIG. 5B  Sequence in DCM, $V_{OUT}/V_{IN} < 50\%$

Sequence in DCM, $V_{OUT}/V_{IN} > 50\%$

Sequence in DCM, $V_{OUT}/V_{IN}>50\%$

MULTI-LEVEL STEP-UP CONVERTER TOPOLOGIES, CONTROL AND SOFT START SYSTEMS AND METHODS

This application is related to U.S. application Ser. No. 14/211,922, filed on Mar. 14, 2014. The entire disclosure of the application referenced above is incorporated herein by reference.

CROSS-REFERENCE TO RELATED APPLICATIONS

This application claims the benefit of U.S. Provisional Application No. 61/787,557, filed on Mar. 15, 2013. The entire disclosure of the application referenced above is incorporated herein by reference.

FIELD

The present disclosure relates to step-up converters, and more particularly to multi-level step-up converters and soft start modules for multi-level step-up converters.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Handheld consumer electronics such as cell phones and smartphones typically require high-efficiency DC-DC power supplies. Some consumer electronics require an output voltage that is larger than the input voltage that is typically supplied by a battery. Large voltage step-up ratios typically require specialized high-voltage transistor devices and large magnetic components such as inductors that determine the total volume, efficiency and cost of the power supply.

Referring now to FIGS. 1A and 1B, a step-up converter 10 according to the prior art is shown. The step-up converter 10 includes a voltage supply $V_{IN}$ that is connected to one end of an inductor L. First and second transistors $Q_{SR}$ and $Q_{MS}$ each include a control terminal and first and second terminals. The second terminal of the transistor $Q_{SR}$ is connected to a node LX. The node LX is also connected to another end of the inductor L and to a first terminal of the transistor $Q_{MS}$.

The first terminal of transistor $Q_{SR}$ is connected to an output capacitor $C_{OUT}$ and to a load. A voltage output $V_{OUT}$ of the step-up converter 10 is provided at the first terminal of the transistor $Q_{SR}$. The step-up converter 10 operates at a duty cycle D and a period T.

In FIG. 1B, voltage is shown as a function of time at the node LX and across the transistor $Q_{MS}$. As can be appreciated, the voltage swing on the inductor L during operation is $V_{OUT}$. Large voltage step-up ratios typically require specialized high-voltage laterally diffused MOS (LDMOS) devices. The large inductor L substantially determines the total volume, efficiency and cost of the step-up converter 10. In particular, the large size of the inductor has up to now made it commercially impractical to co-integrate the inductor with the MOS switch devices.

In FIG. 1C, a multi-level step-down converter 50 includes a voltage source VIN and transistors $Q_{MS1}$, $Q_{MS2}$, $Q_{SR1}$ and $Q_{SR2}$. The voltage source $V_{IN}$ is connected to a first terminal of the transistor $Q_{MS2}$. A first terminal of the transistor $Q_{MS2}$ and a second terminal of the transistor $Q_{MS1}$ are connected to one end of the capacitor $C_{fly}$. A second terminal of the transistor $Q_{MS1}$ and a first terminal of the transistor $Q_{SR1}$ are connected to a node LX and to one end of an inductor L. A second terminal of the transistor $Q_{SR1}$ and a first terminal of the transistor $Q_{SR2}$ are connected to another end of the capacitor $C_{fly}$. Another end of the inductor L is connected to a capacitor $C_{OUT}$ and to a load.

Multi-level step-down converters shown in FIG. 1C have been used in high voltage (1-5 kV) applications. Switches used in the converters are rated to withstand approximately half of a maximum input voltage. However, other multi-level step-down converter topologies are typically used at lower voltages. The topology in FIG. 1C encounters problems during start-up when the switches $Q_{SR1}$ and $Q_{MS2}$ need to withstand the full input voltage due to 0V across the capacitor $C_{fly}$, which is initially uncharged. During normal operation, voltage transients at the input are immediately passed through to an $N^{th}$ switch pair, which necessitates additional voltage over-rating. In practice, the low side switch $Q_{SRN}$ requires a 2× voltage over-rating, and the high side switch $Q_{MS2}$ requires an N times voltage over-rating, where N is equal to the number of series-connected transistor pairs or stages and is an integer greater than one.

SUMMARY

A multi-level, step-up converter circuit includes an inductor including one terminal in communication with an input voltage supply. N transistor pairs are connected in series, where N is an integer greater than one. First and second transistors of a first pair of the N transistor pairs are connected together at a node. The node is in communication with another terminal of the inductor. Third and fourth transistors of a second pair of the N transistor pairs are connected to the first and second transistors, respectively. (N−1) capacitors have terminals connected between the N transistor pairs, respectively. An output capacitor has a terminal in communication with at least one transistor of the N transistor pairs.

In other features, a control module is configured to control states of the N transistor pairs. The control module is configured to charge the (N−1) capacitors to predetermined levels prior to converter operation. The control module controls the states of the N transistor pairs based in part on a duty cycle D and period T. When operating in a continuous current switching mode with a duty cycle that is less than 50%, the control module is configured to control the states of the first, second, third and fourth transistors, at least one of sequentially and non-sequentially, in a first switching mode in which the first and third transistors are closed and the second and fourth transistors are open; a second switching mode in which the first and third transistors are closed and the second and fourth transistors are open; a third switching mode in which the first and fourth transistors are closed and the second and third transistors are open; and a fourth switching mode in which the first and third transistors are closed and the second and fourth transistors are open.

In other features, when operating in a continuous current switching mode with a duty cycle that is less than 50%, the control module is configured to operate, at least one of sequentially and non-sequentially, in first, second, third and fourth switching modes. During the first switching mode, current is supplied by at least one of the (N−1) capacitors to a load. During the second switching mode, current is supplied by the inductor to the load. During the third switching mode, at least one of the (N−1) capacitors is charged. During the fourth switching mode, current is supplied by the inductor to the load.

In other features, the control module is configured to transition from the first switching mode to the second switching mode at D*T; from the second switching mode to a third switching mode at T/2; from the third switching mode to the fourth switching mode at (½+D)*T; and from the fourth switching mode to the first switching mode at T, where T is a period and D is the duty cycle.

In other features, when operating in a continuous current switching mode with a duty cycle that is greater than 50%, the control module is configured to control the states of the first, second, third and fourth transistors, at least one of sequentially and non-sequentially, in a first switching mode in which the first and third transistors are open and the second and fourth transistors are closed; a second switching mode in which the second and third transistors are closed and the first and fourth transistors are open; a third switching mode in which the first and third transistors are open and the second and fourth transistors are closed; and a fourth switching mode in which the first and fourth transistors are closed and the second and third transistors are open.

In other features, when operating in a continuous current switching mode with a duty cycle that is greater than 50%, the control module is configured to operate, at least one of sequentially and non-sequentially, in first, second, third and fourth switching modes. During the first and third switching mode, current flows to ground. During the second switching mode, current is supplied by at least one of the (N−1) capacitors to a load. During the fourth switching mode, at least one of the (N−1) capacitors is charged.

In other features, the control module transitions from the first switching mode to the second switching mode at (D−½)*T; from the second switching mode to the third switching mode at T/2; from the third switching mode to the fourth switching mode at D*T; and from the fourth switching mode to the first switching mode at T, where T is a period and D is the duty cycle.

In other features, when operating in a discontinuous current switching mode with $V_{OUT}/V_{IN}$ that is less than 50%, the control module controls the states of the first, second, third and fourth transistors, at least one of sequentially and non-sequentially, in a first switching mode in which the second and third transistors are closed and the first and fourth transistors are open; a second switching mode in which the first and third transistors are closed and the second and fourth transistors are open; a third switching mode in which the second, third and fourth transistors are open and the first transistor is open; a fourth switching mode in which the first and fourth transistors are closed and the second and third transistors are open; a fifth switching mode in which the first and third transistors are closed and the second and fourth transistors are open; and a sixth switching mode in which the first, second and fourth transistors are open and the third transistor is open.

In other features, when operating in a discontinuous current switching mode with $V_{OUT}/V_{IN}$ that is less than 50%, the control module operates, at least one of sequentially and non-sequentially, in a first switching mode, a second switching mode, a third switching mode, a fourth switching mode, a fifth switching mode and a sixth switching mode. During the first switching mode, current is supplied by at least one of the (N−1) capacitors to a load. During the second switching mode, current is supplied by the inductor to the load. During the third switching mode, current is not supplied to the load or the (N−1) capacitors. During the fourth switching mode, at least one of the (N−1) capacitors is charged. During the fifth switching mode, current is supplied by the inductor to the load. During the sixth switching mode, current is not supplied to the load or the (N−1) capacitors.

In other features, the control module is configured to transition from the first switching mode to the second switching mode when current is equal to a predetermined current; from the second switching mode to the third switching mode when current is zero; from the third switching mode to the fourth switching mode at T/2; from the fourth switching mode to the fifth switching mode when current is equal to a predetermined current; from the fifth switching mode to the sixth switching mode when current is zero; and from the sixth switching mode to the first switching mode at T, where T is a period and D is a duty cycle.

In other features, when operating in a discontinuous current switching mode with $V_{OUT}/V_{IN}$ that is greater than 50%, the control module is configured to control the states of the first, second, third and fourth transistors, at least one of sequentially and non-sequentially, in a first switching mode in which the first and third transistors are open and the second and fourth transistors are closed; a second switching mode in which the second and third transistors are closed and the first and fourth transistors are open; a third switching mode in which the first, third and fourth transistors are open and the second transistor is closed; a fourth switching mode in which the first and third transistors are open and the second and fourth transistors are closed; a fifth switching mode in which the first and fourth transistors are closed and the second and third transistors are open; and a sixth switching mode in which the first, second and third transistors are open and the fourth transistor is closed.

In other features, when operating in a discontinuous current switching mode with $V_{OUT}/V_{IN}$ that is greater than 50%, the control module is configured to operate, at least one of sequentially and non-sequentially, in a first switching mode, a second switching mode, a third switching mode and a fourth switching mode. During the first and fourth switching modes, current flows to ground. During the second switching mode, current is supplied by at least one of the (N−1) capacitors to a load. During the fifth switching mode, at least one of the (N−1) capacitors is charged. During the third and sixth switching modes, current is not supplied to the load or the (N−1) capacitors.

In other features, the control module is configured to transition from the first switching mode to the second switching mode when current is equal to a predetermined current; from the second switching mode to the third switching mode when current is zero; from the third switching mode to the fourth switching mode T/2; from the fourth switching mode to the fifth switching mode when current is equal to the predetermined current; from the fifth switching mode to the sixth switching mode when current is zero; and from the sixth switching mode to the first switching mode at T, where T is a period and D is a duty cycle.

In other features, a current sensor communicates with the control module and is configured to sense current supplied by the inductor. The control module transitions between switching modes of the N transistor pairs based on a duty cycle, a period and current supplied by the inductor current. The control module transitions between switching modes of the N transistor pairs based on inductor current at least one of exceeding a current limit and being equal to zero.

In other features, a soft start module is configured to charge the (N−1) capacitors ratiometrically before converter operation. A soft start module is configured to charge the (N−1) capacitors to voltages that are ratios of an output voltage. The ratios increase monotonically from a lowest ratio on an inner capacitor of the (N−1) capacitors to a highest ratio on an outer capacitor of the (N−1) capacitors.

In other features, a soft start module is configured to sequentially charge the first one of the (N−1) capacitors to 1/N of an output voltage; charge a second one of the (N−1) capacitors to 2/N of the output voltage; and charge an (N−1)th one of the (N−1) capacitors to (N−1)/N of the output voltage.

In other features, the soft start module is configured to initially charge the (N−1) capacitors to the input voltage before charging the (N−1) capacitors to predetermined values. A soft start module is configured to sequentially charge the (N−1) capacitors to (N−1) fractions of an output voltage, respectively, before converter operation. A soft start module includes a driver module configured to generate a first signal when the N transistor pairs are ready to switch; a first charging circuit configured to charge the (N−1) capacitors to the input voltage and to generate a second signal; and a second charging circuit configured to sequentially charge the (N−1) capacitors to (N−1) fractions of an output voltage, respectively, in response to the first signal and the second signal being generated.

In other features, the second charging circuit charges an (N−1)th one of the (N−1) capacitors to (N−1)/N of an output voltage.

A system comprises P multi-level, step-up converter circuits, where P is an integer greater than one, and a control module configured to control states of the P multi-level, step-up converter circuits.

A system comprises P multi-level, step-up converters. Inductor nodes for the P multi-level, step-up converters and an output capacitor node for the P multi-level, step-up converters are in communication, respectively. A control module is configured to control states of the multi-level, step-up converter and the second multi-level, step-up converter. In other features, the inductor of the P multi-level, step-up converters are magnetically coupled by a magnetic component. The magnetic component and one or more of the N transistor pairs are integrated on a single substrate.

In other features, the inductor current is sensed as a voltage across one or more of the N transistor pairs. One or more of the N transistor pairs are integrated on a single substrate. One or more of the N−1 capacitors connected between the N transistor pairs are integrated on a single substrate. One or more of the N−1 capacitors and one or more of the N transistor pairs are integrated on a single substrate. The inductor and one or more of the N transistor pairs are integrated on a single substrate.

In other features, the inductor, N−1 capacitors, and N transistor pairs are integrated to create a monolithic converter system.

In other features, the control module controls the states of the N transistor pairs using at least one of fixed-frequency duty cycle modulation using voltage mode control, peak current mode control, average current mode control, valley current mode control, constant on-time, constant off-time, output voltage, inductor current hysteretic, pulse frequency modulation (PFM) or pulse density modulation.

In other features, the period T is modified in response to a sensed output current. The period T is modified in response to a programmed output current. The period T is derived from an external clock signal. The voltages across the (N−1) capacitors are sensed and duty cycles DN of the N transistor pairs are modified to maintain predetermined voltage ratios on the (N−1) capacitors.

A control circuit for a step-up converter includes a soft start module configured to control states of N transistor pairs of the step-up converter, where N is an integer greater than two. A driver module is in communication with the soft start module and is configured to generate a first signal when N transistor pairs of the step-up converter are ready to switch. A first charging circuit is configured to charge (N−1) capacitors of the step-up converter to an input voltage of the step-up converter in response to the first signal and to generate a second signal when charging is complete. A second charging circuit is configured to sequentially charge the (N−1) capacitors of the step-up converter to (N−1) predetermined voltage values in response to the first signal and the second signal and before operation of the step-up converter begins.

In other features, the (N−1) predetermined voltage values correspond to (N−1) fractions, respectively, of an output voltage of the step-up converter. The second charging circuit is configured to charge the (N−1) capacitors ratiometrically before operation of the step-up converter. The second charging circuit is configured to charge the (N−1) capacitors to voltages that are ratios of an output voltage of the step-up converter. The ratios increase monotonically from a lowest ratio on an inner capacitor of the (N−1) capacitors to a highest ratio on an outer capacitor of the (N−1) capacitors.

In other features, the second charging circuit is configured to sequentially charge the first one of the (N−1) capacitors to 1/N of an output voltage of the step-up converter; charge a second one of the (N−1) capacitors to 2/N of the output voltage of the step-up converter; and charge an (N−1)th one of the (N−1) capacitors to (N−1)/N of the output voltage of the step-up converter.

In other features, the second charging circuit is configured to sequentially charge the (N−1) capacitors to (N−1) fractions of the output voltage, respectively, before operation. The second charging circuit charges an (N−1)th one of the (N−1) capacitors to (N−1)/N of an output voltage of the step-up converter. The first charging circuit includes a current charging circuit that pulls terminals of the (N−1) capacitors low.

A system comprises the control circuit and the step-up converter. The step-up converter comprises an inductor including one end in communication with an input voltage supply and the N transistor pairs where N is an integer greater than one. First and second transistors of a first pair of the N transistor pairs are connected together and communicate with the inductor. Third and fourth transistors of a second pair of the N transistor pairs are connected to the first and second transistors, respectively. The (N−1) capacitors are connected between the N transistor pairs, respectively. An output capacitor is in communication with at least one transistor of the N transistor pairs. A control module controls states of the N transistor pairs during operation of the step-up converter.

A step-up converter circuit includes an inductor including one end in communication with an input voltage supply. N transistor pairs are connected in series, where N is an integer greater than one. First and second transistors of a first pair of the N transistor pairs are connected together at a node. The node is in communication with another terminal of the inductor. Third and fourth transistors of a second pair of the N transistor pairs are connected to the first and second transistors, respectively. (N−1) capacitors have terminals connected between the N transistor pairs, respectively. An output capacitor has a terminal in communication with at least one transistor of the Nth transistor pair. A control module initiates converter operation after the (N−1) capacitors are charged to (N−1) predetermined voltage values and controls states of the N transistor pairs during converter operation.

In other features, a soft start module is configured to charge the (N−1) capacitors to the (N−1) predetermined voltage values. The (N−1) predetermined voltage values correspond to (N−1) predetermined ratios of an output voltage of the step-up converter. The (N−1) predetermined ratios increase monotonically from a lowest ratio on an inner capacitor of the (N−1) capacitors to a highest ratio on an outer capacitor of the (N−1) capacitors. A soft start module is configured to sequentially charge a first one of the (N−1) capacitors to 1/N of an output voltage of the step-up converter; charge a second one of the (N−1) capacitors to 2/N of the output voltage of the step-up converter; and charge an (N−1)th one of the (N−1) capacitors to (N−1)/N of the output voltage of the step-up converter.

In other features, a first charging circuit is configured to initially charge the (N−1) capacitors to the input voltage before charging to the (N−1) predetermined voltage values. A start-up circuit includes a soft start module configured to control states of the N transistor pairs. A driver module is in communication with the soft start module and is configured to generate a first signal when N transistor pairs of the step-up converter are ready to switch. A first charging circuit is configured to charge the (N−1) capacitors to an input voltage of the step-up converter and to generate a second signal when charging is complete. A second charging circuit is configured to sequentially charge the (N−1) capacitors to the (N−1) predetermined voltage values in response to the first signal and the second signal being generated and before operation of the step-up converter begins.

A circuit comprises a step-up converter including N stages and (N−1) capacitors, where N is an integer greater than one. A start-up module is configured to charge the (N−1) capacitors to (N−1) predetermined voltage values corresponding to (N−1) predetermined ratios of an output voltage of the step-up converter. A control module is configured to initiate converter operation after the (N−1) capacitors are charged to (N−1) predetermined voltage values and to control the N stages during converter operation.

In other features, the step-up converter comprises an inductor including one end in communication with an input voltage. The N stages comprise N transistor pairs. First and second transistors of a first pair of the N transistor pairs are connected together and communicate with the inductor. Third and fourth transistors of a second pair of the N transistor pairs are connected to the first and second transistors, respectively. The (N−1) capacitors are connected between the N transistor pairs, respectively. An output capacitor is in communication with at least one transistor of the N transistor pairs.

In other features, the (N−1) predetermined ratios increase monotonically from a lowest ratio on an inner capacitor of the (N−1) capacitors to a highest ratio on an outer capacitor of the (N−1) capacitors. The start-up module is configured to sequentially charge a first one of the (N−1) capacitors to 1/N of an output voltage of the step-up converter; charge a second one of the (N−1) capacitors to 2/N of the output voltage of the step-up converter; and charge an (N−1)th one of the (N−1) capacitors to (N−1)/N of the output voltage of the step-up converter.

In other features, a first charging circuit is configured to initially charge the (N−1) capacitors to an input voltage to the step-up converter before charging to the (N−1) predetermined voltage values. The start-up module includes a soft start module configured to control states of the N transistor pairs. A driver module is in communication with the soft start module and configured to generate a first signal when N transistor pairs of the step-up converter are ready to switch. A first charging circuit is configured to charge the (N−1) capacitors to an input voltage of the step-up converter and to generate a second signal when charging is complete. A second charging circuit is configured to sequentially charge the (N−1) capacitors to the (N−1) predetermined voltage values in response to the first signal and the second signal and before operation of the step-up converter begins.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5B illustrates current flow and switch positions during a period for FIG. 5A;

In the drawings, reference numbers may be reused to identify similar and/or identical elements.

DETAILED DESCRIPTION

Multi-level step-up converters according to the present disclosure employ a network of switches and capacitors to modify a voltage waveform across a magnetic component such as an inductor. Multi-level step-up converters according to the present disclosure cut the voltage swing and decrease a period of the voltage waveform by a factor of N, where N is equal to the number of transistor pairs or stages and is an integer greater than one.

Multi-level step-up converters described herein decrease the volt-seconds applied to the magnetic component by a factor on the order of $N^2$, which decreases the value of the inductor and the magnetic energy storage requirement of the inductor. This decrease allows improvement of power loss in the inductor and case size reduction. The network of switches and capacitors does not increase the power loss in the switches, due to the reduced switch voltage ratings allowed by the series switch connections. Switches with reduced voltage ratings typically exhibit superior performance, as measured by resistance per unit area and resistance per switching energy. Furthermore, in contrast to switched-capacitor circuits, it will be shown that certain preferred switch commutation patterns incur no loss due to charge equalization, and are insensitive to the finite values of the capacitances.

Figure 2:
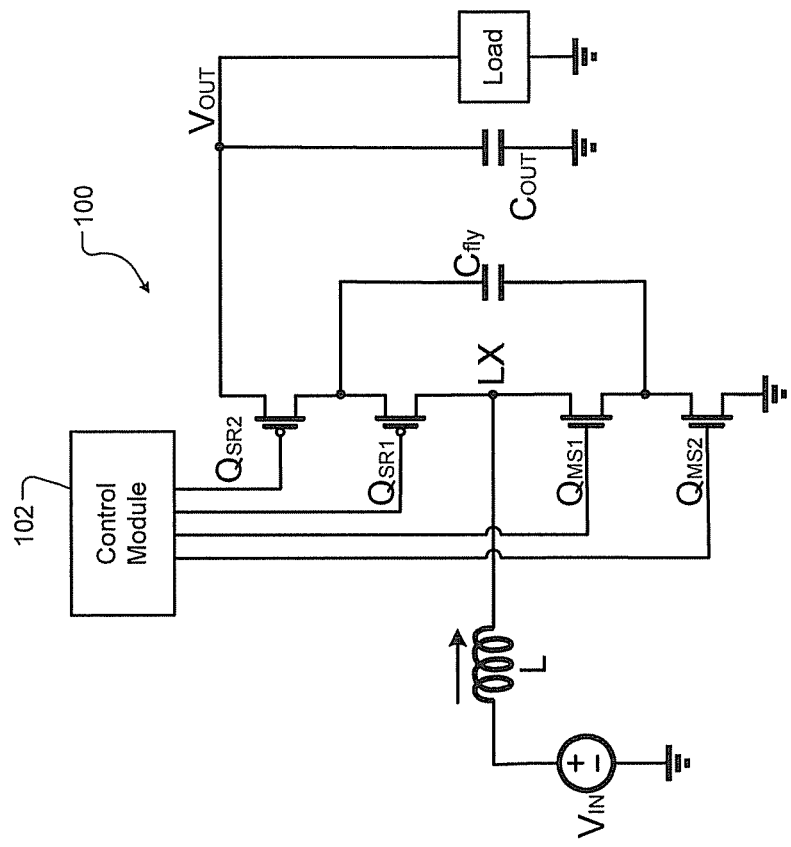
FIG. 2 is electrical schematic of an example multi-level step-up converter according to the present disclosure.
Figure 1C:
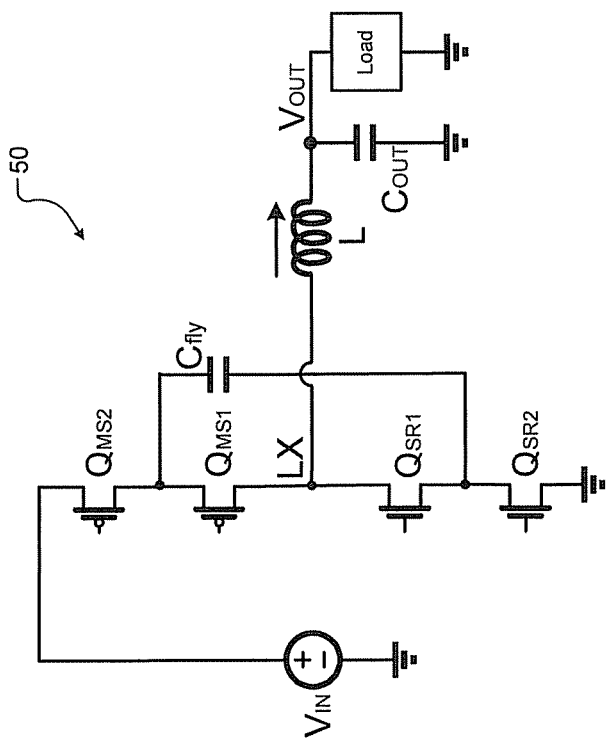
FIG. 1C is electrical schematic of an example multi-level buck converter according to the prior art.

Referring now to FIG. 2, an example of a multi-level step-up converter 100 is shown. The multi-level step-up converter 100 has N=2 stages. The multi-level step-up converter 100 includes a voltage supply $V_{IN}$ that is connected to one end of an inductor L. A first pair of transistors $Q_{SR1}$ and $Q_{MS1}$ includes a control terminal and first and second terminals. The second terminal of the transistor $Q_{SR1}$ is connected to a node LX. The node LX is also connected to another end of the inductor L and to a first terminal of the transistor $Q_{MS1}$.

A second pair of transistors $Q_{SR2}$ and $Q_{MS2}$ include a control terminal and first and second terminals. A second terminal of the transistor $Q_{SR2}$ is connected to a first terminal of the first transistor $Q_{SR1}$. A second terminal of the transistor $Q_{MS1}$ is connected to a first terminal of the transistor $Q_{MS2}$.

The first terminal of transistor $Q_{SR2}$ is connected to an output capacitor $C_O$. A voltage output $V_{OUT}$ of the multi-level step-up converter 100 is taken at the first terminal of the transistor $Q_{SR2}$. One end of a capacitor $C_{fly}$ is connected between the second terminal of $Q_{SR2}$ and the first terminal of $Q_{SR1}$. Another end of the capacitor $C_{fly}$ is connected between the second terminal of $Q_{MS1}$ and to a first terminal of the transistor $Q_{MS2}$.

The multi-level step-up topology described in the present disclosure, when operated using a start-up sequence, exhibits no voltage over-stress during start-up, which allows the use of optimally rated switches. Furthermore, because the inductor is placed at the input of the converter, input over-voltage transients during normal operation are isolated from the switches and also do not require any switch voltage over-rating.

Figure 1A:
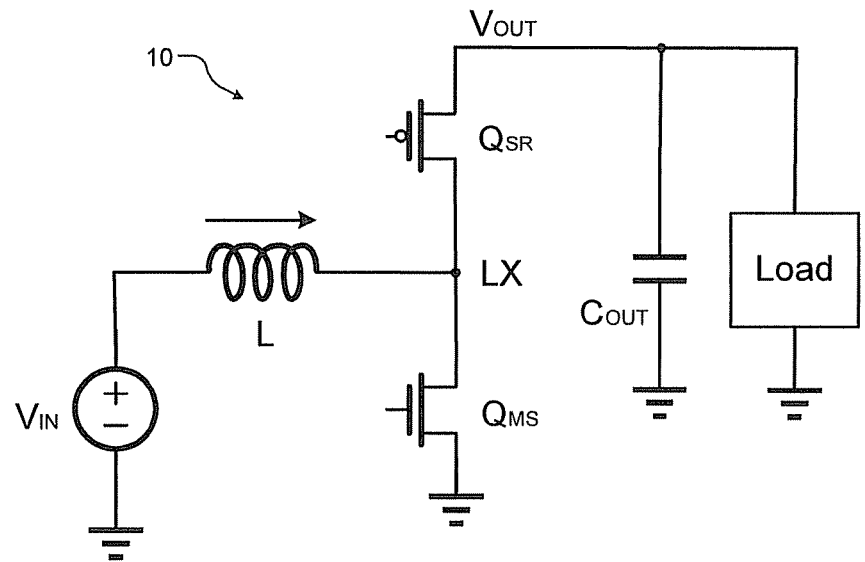
FIG. 1A is electrical schematic of a step-up converter according to the prior art.
Figure 1B:
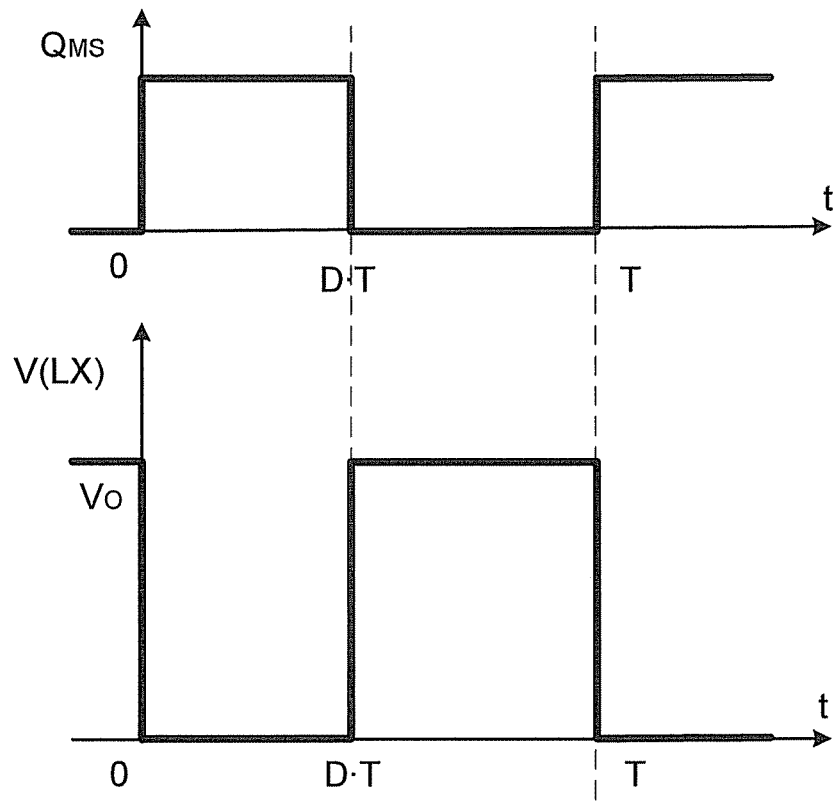
FIG. 1B is a waveform diagram illustrating operation of the step-up converter of FIG. 1A according to the prior art.

Compared to FIG. 1A, the multi-level step-up topology described in the present disclosure also greatly reduces the impact of right-half-plane zero control challenges posed by the traditional boost topology. Specifically, because the practical implementation of the multi-level step-up converter enables a reduction in inductor value by a factor of approximately N to $N^2$, the closed loop bandwidth can be increased without degrading phase margin and stability. This benefit applies only to step-up converters but not step-down converters, which do not exhibit a right half plane zero in the power stage transfer function.

The family of topologies described in the present disclosure is particularly suited for power conversion applications, where the switch voltage rating is small compared to the application voltages. This is especially advantageous in integrated applications, where the switch voltage ratings available in modern digital processes are limited to a few volts. For example only, a step-up converter achieving 15V output can be realized in a standard 180 nm CMOS process using only 3.3V logic devices, using an N=5 configuration. Such a large number of stages are more practical in integrated manufacturing, where the switches and level shifts and control can all be integrated on a single substrate.

Additional size reductions are possible with the present disclosure when the passive components are integrated. Recent advances in trench capacitor technology and fabrication make the integration of the flying capacitors practical, eliminating the extra interconnect pins and enabling much larger numbers of stages N. Finally, emerging integrated inductor technologies with limited energy storage densities benefit from the substantial decreases in inductor value enabled by the present disclosure, making fully integrated step-up converters possible for the first time.

Figure 3A:
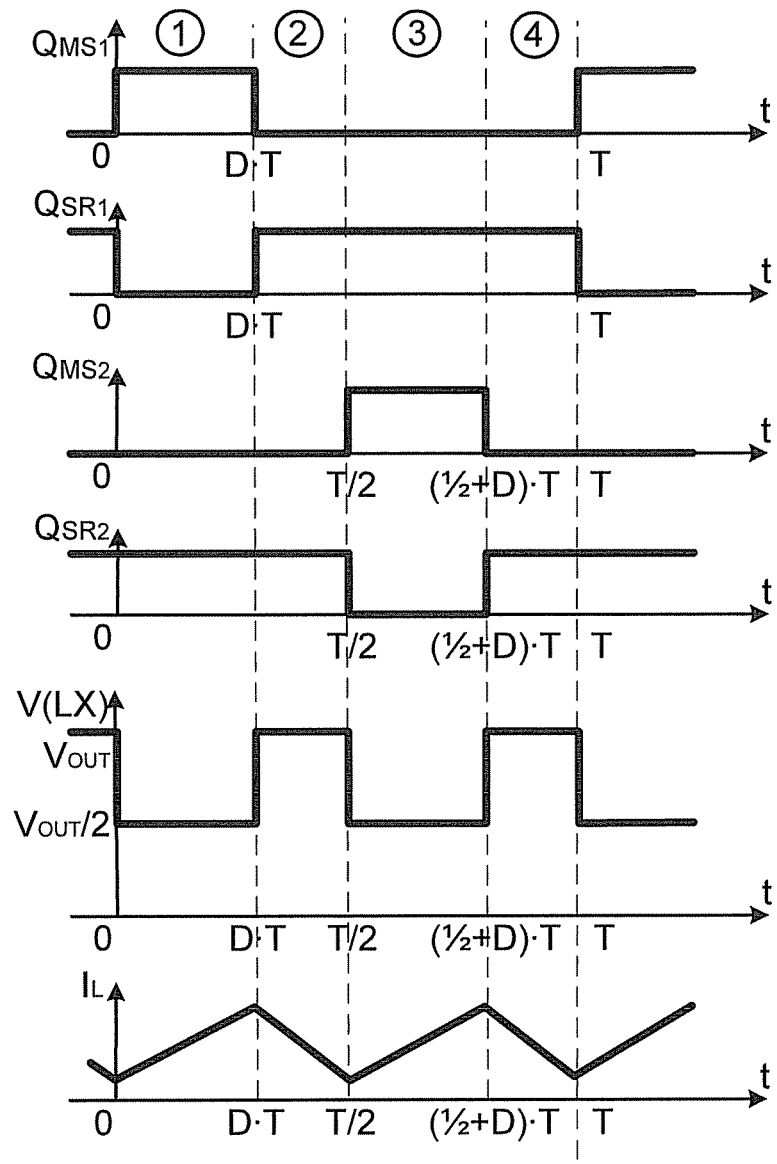
FIG. 3A is a waveform diagram illustrating operation of the example step-up converter of FIG. 2 operating in a continuous conduction mode with a duty cycle less than 50%.
Figure 3B:
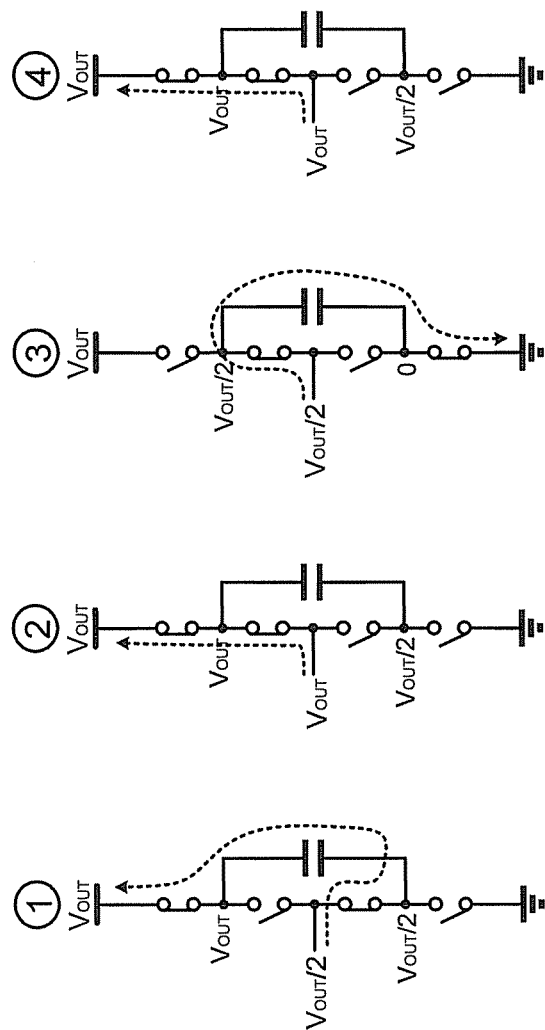
FIG. 3B illustrates current flow and switch positions during a period for FIG. 3A.

Referring now to FIGS. 3A-3B, operation in a continuous conduction mode (CCM) with a duty cycle less than 50% is shown. Switching takes place at 0, D*T, T/2, and (½+D)*T and then repeats at T, where T is the period. Voltage at the node LX swings between $V_{OUT}$ and $V_{OUT}/2$.

During a first switching mode, the transistors $Q_{SR2}$ and $Q_{MS1}$ are closed and the transistors $Q_{SR1}$ and $Q_{MS2}$ are open. Current is supplied to the load by the capacitor $C_{fly}$ as shown, which allows the inductor current $I_L$ to rise during the first switching mode. During a second switching mode, the transistors $Q_{SR1}$ and $Q_{SR2}$ are closed and the transistors $Q_{MS1}$ and $Q_{MS2}$ are open. Load current is supplied by the inductor L. During a third switching mode, the transistors $Q_{SR1}$ and $Q_{MS2}$ are closed and the transistors $Q_{MS1}$ and $Q_{SR2}$ are open. The inductor L charges the capacitor $C_{fly}$. During a fourth switching mode, the transistors $Q_{SR1}$ and $Q_{SR2}$ are closed and the transistors $Q_{MS1}$ and $Q_{MS2}$ are open. The inductor L supplies current to the load. As can be appreciated, the switching modes may be sequential as shown in FIG. 3B or non-sequential.

Figure 4A:
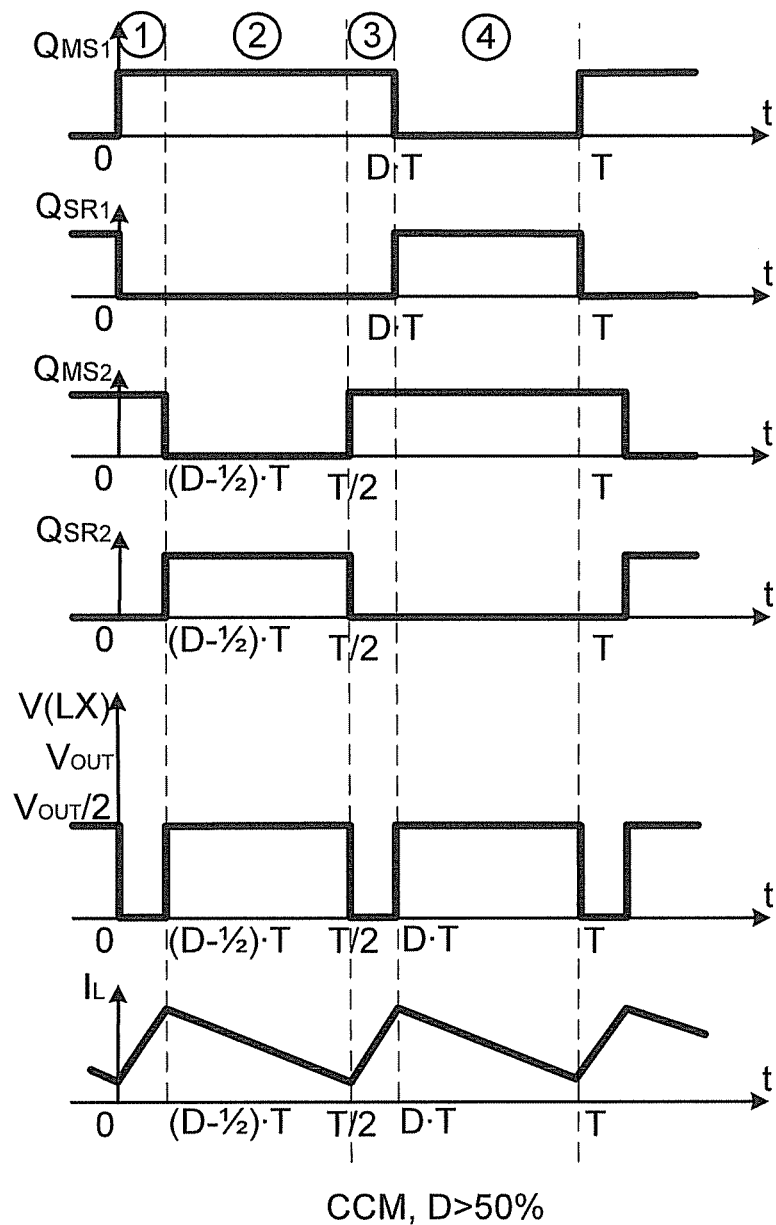
FIG. 4A is a waveform diagram illustrating operation of the example step-up converter of FIG. 2 in a continuous conduction mode with a duty cycle greater than 50%.
Figure 4B:
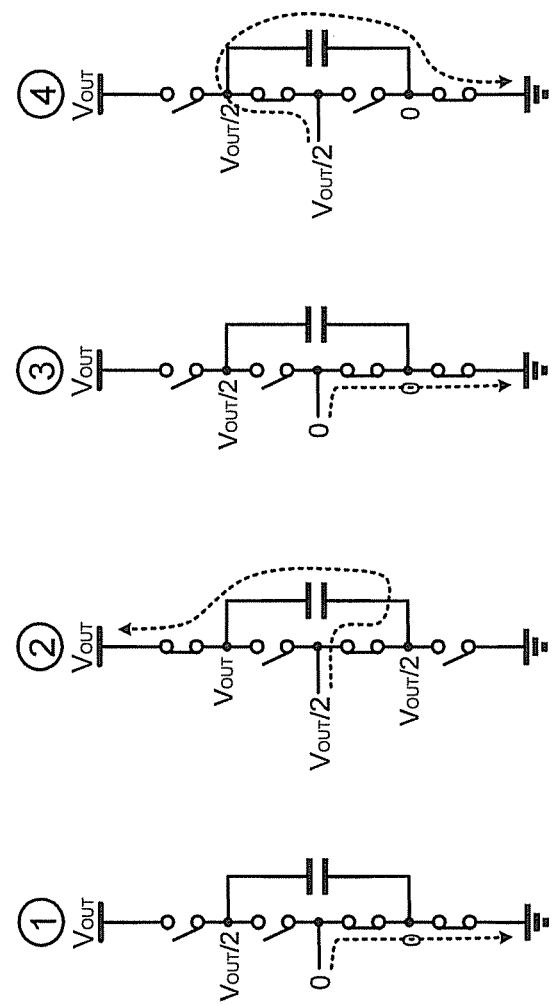
FIG. 4B illustrates current flow and switch positions during a period for FIG. 4A.

Referring now to FIGS. 4A-4B, operation in the CCM with a duty cycle greater than 50% is shown. Switching takes place at 0, (D-½)*T, T/2, and D*T and then repeats at T, where T is the period. Voltage at the node LX swings between $V_{OUT}/2$ and 0.

During a first switching mode, the transistors $Q_{MS1}$ and $Q_{MS2}$ are closed and the transistors $Q_{SR1}$ and $Q_{SR2}$ are open. Inductor current $I_L$ rises during the first switching mode. During a second switching mode, the transistors $Q_{MS1}$ and $Q_{SR2}$ are closed and the transistors $Q_{SR1}$ and $Q_{MS2}$ are open. Load current is supplied by the capacitor $C_{fly}$. During a third switching mode, the transistors $Q_{MS1}$ and $Q_{MS2}$ are closed and the transistors $Q_{SR1}$ and $Q_{SR2}$ are open. Inductor current $I_L$ rises during the third switching mode. During a fourth switching mode, the transistors $Q_{SR1}$ and $Q_{MS2}$ are closed and the transistors $Q_{MS1}$ and $Q_{SR2}$ are open. The inductor L charges the capacitor $C_{fly}$. As can be appreciated, the switching modes may be sequential as shown in FIG. 4B or non-sequential.

Figure 5A:
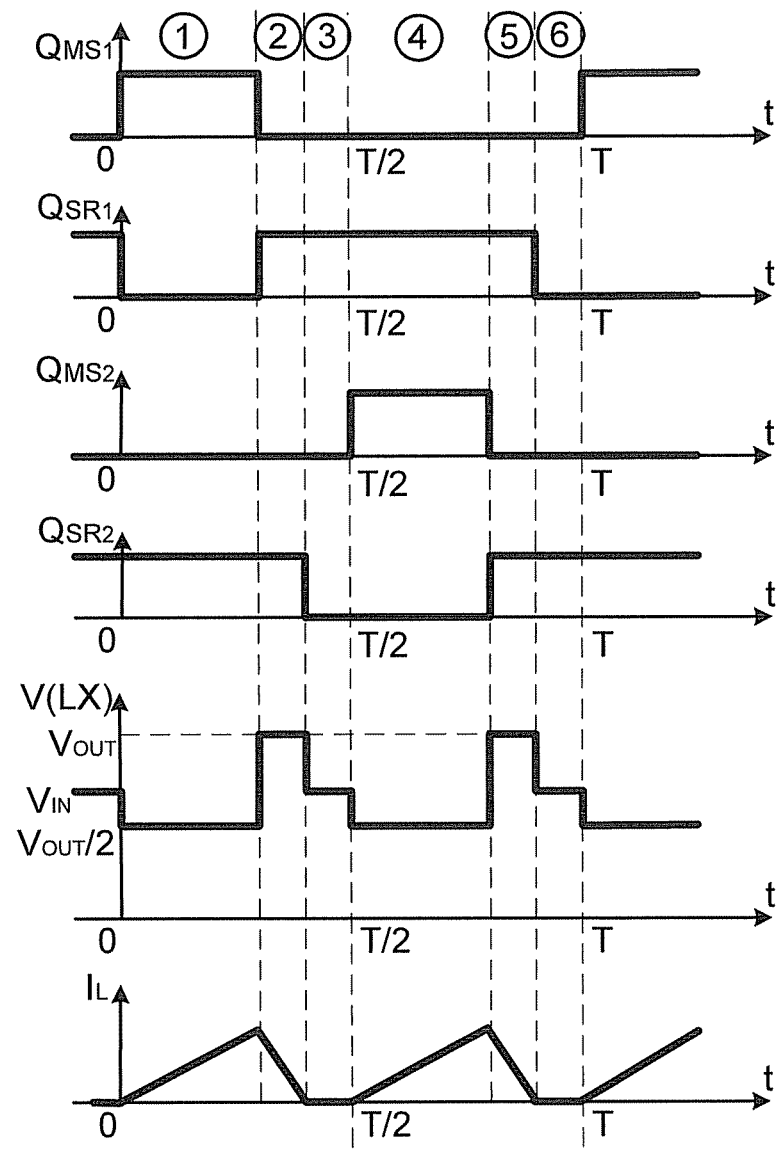
FIG. 5A illustrates waveforms showing voltage at the node LX, inductor current and voltage across switches of the step-up converter of FIG. 2 during a discontinuous conduction mode with $V_{OUT}/V_{IN}$ less than 50%.

Referring now to FIGS. 5A and 5B, operation of the step-up converter in a discontinuous mode (DCM) with duty cycle or $V_{OUT}/V_{IN}$<50% is shown. During a first switching mode, the transistors $Q_{SR2}$ and $Q_{MS1}$ are closed and the transistors $Q_{SR1}$ and $Q_{MS2}$ are open. Current is supplied to the load by the capacitor $C_{fly}$ as shown, which allows the inductor current $I_L$ to rise during the first switching mode. During a second switching mode, the transistors $Q_{SR1}$ and $Q_{SR2}$ are closed and the transistors $Q_{MS1}$ and $Q_{MS2}$ are open. Load current is supplied by the inductor L. During a third switching mode, the transistor $Q_{SR1}$ is closed and the remaining transistors are open. Current is not supplied to the load and the node LX is at $V_{IN}$.

During a fourth switching mode, the transistors $Q_{SR1}$ and $Q_{MS2}$ are closed and the transistors $Q_{MS1}$ and $Q_{SR2}$ are open. The inductor L charges the capacitor C. During a fifth period, the transistors $Q_{SR1}$ and $Q_{SR2}$ are closed and the transistors $Q_{MS1}$ and $Q_{MS2}$ are open. The inductor L supplies current to the load. During a sixth period, the transistor $Q_{SR2}$ is closed and the remaining transistors are open. Current is not supplied to the load and the node LX is at $V_{IN}$. As can be appreciated, the switching modes may be sequential as shown in FIG. 5B or non-sequential.

Figure 6A:
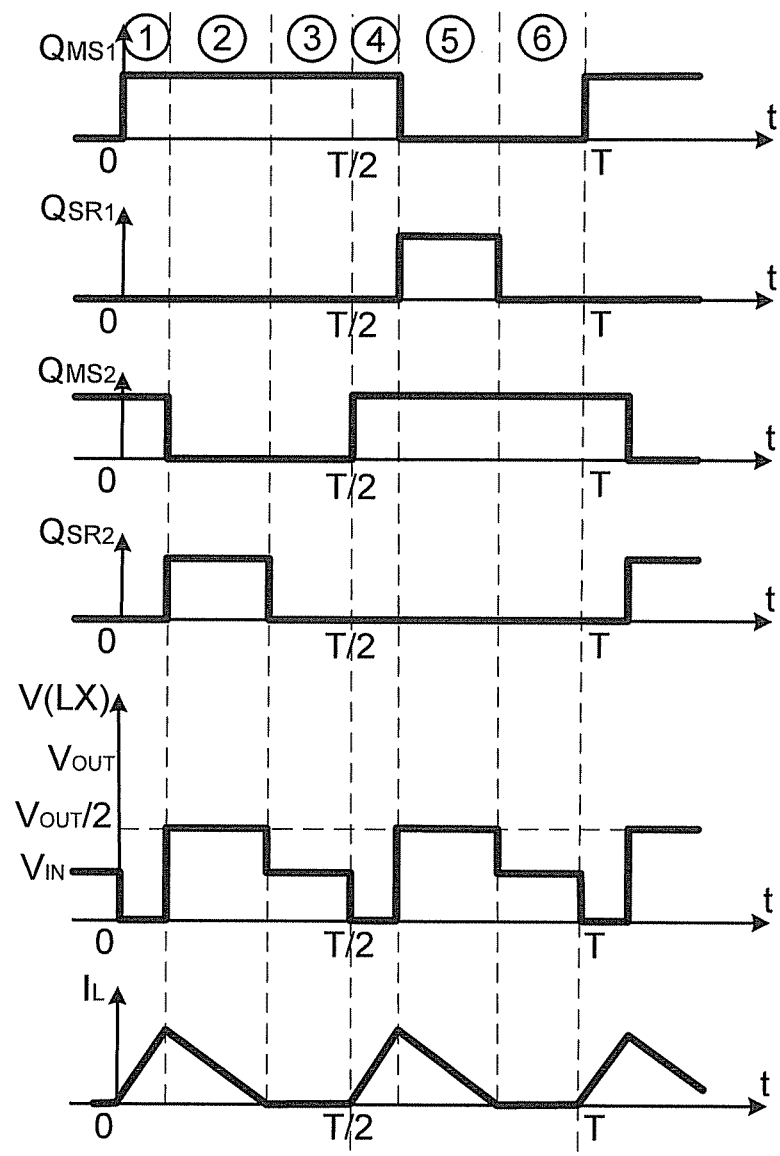
FIG. 6A illustrates waveforms showing voltage at the node LX, inductor current and voltage across switches of the step-up converter of FIG. 2 according to the present disclosure during a discontinuous conduction mode with $V_{OUT}/V_{IN}$ greater than 50%.
Figure 6B:
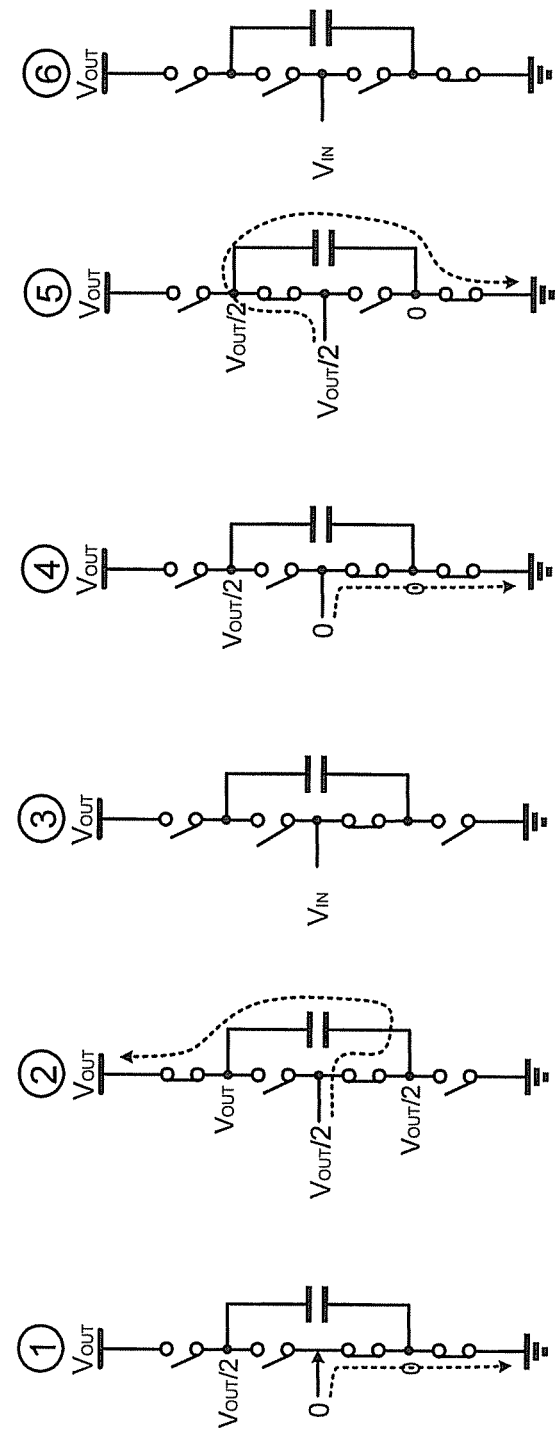
FIG. 6B illustrates current flow and switch positions during a period for FIG. 6A.

Referring now to FIGS. 6A and 6B, operation of the step-up converter in the DCM with duty cycle or $V_{OUT}/V_{IN}$>50% is shown. During a first switching mode, the transistors $Q_{MS1}$ and $Q_{MS2}$ are closed and the transistors $Q_{SR1}$ and $Q_{SR2}$ are open. Inductor current $I_L$ rises during the first switching mode. During a second switching mode, the transistors $Q_{MS1}$ and $Q_{SR2}$ are closed and the transistors $Q_{SR1}$ and $Q_{MS2}$ are open. Load current is supplied by the capacitor $C_{fly}$. During a third switching mode, the transistor $Q_{MS1}$ is closed and the remaining transistors are open. Current is not supplied to the load and the node LX is at $V_{IN}$.

During a fourth switching mode, the transistors $Q_{MS1}$ and $Q_{MS2}$ are closed and the transistors $Q_{SR1}$ and $Q_{SR2}$ are open. Inductor current $I_L$ rises during the first switching mode. During a fifth period, the transistors $Q_{SR1}$ and $Q_{MS2}$ are closed and the transistors $Q_{MS1}$ and $Q_{SR2}$ are open. The inductor L charges the capacitor $C_{fly}$. During a sixth period, the transistor $Q_{MS2}$ is closed and the remaining transistors are open. Current is not supplied to the load and the node LX is at $V_{IN}$. As can be appreciated, the switching modes may be sequential as shown in FIG. 6B or non-sequential.

Figure 7A:
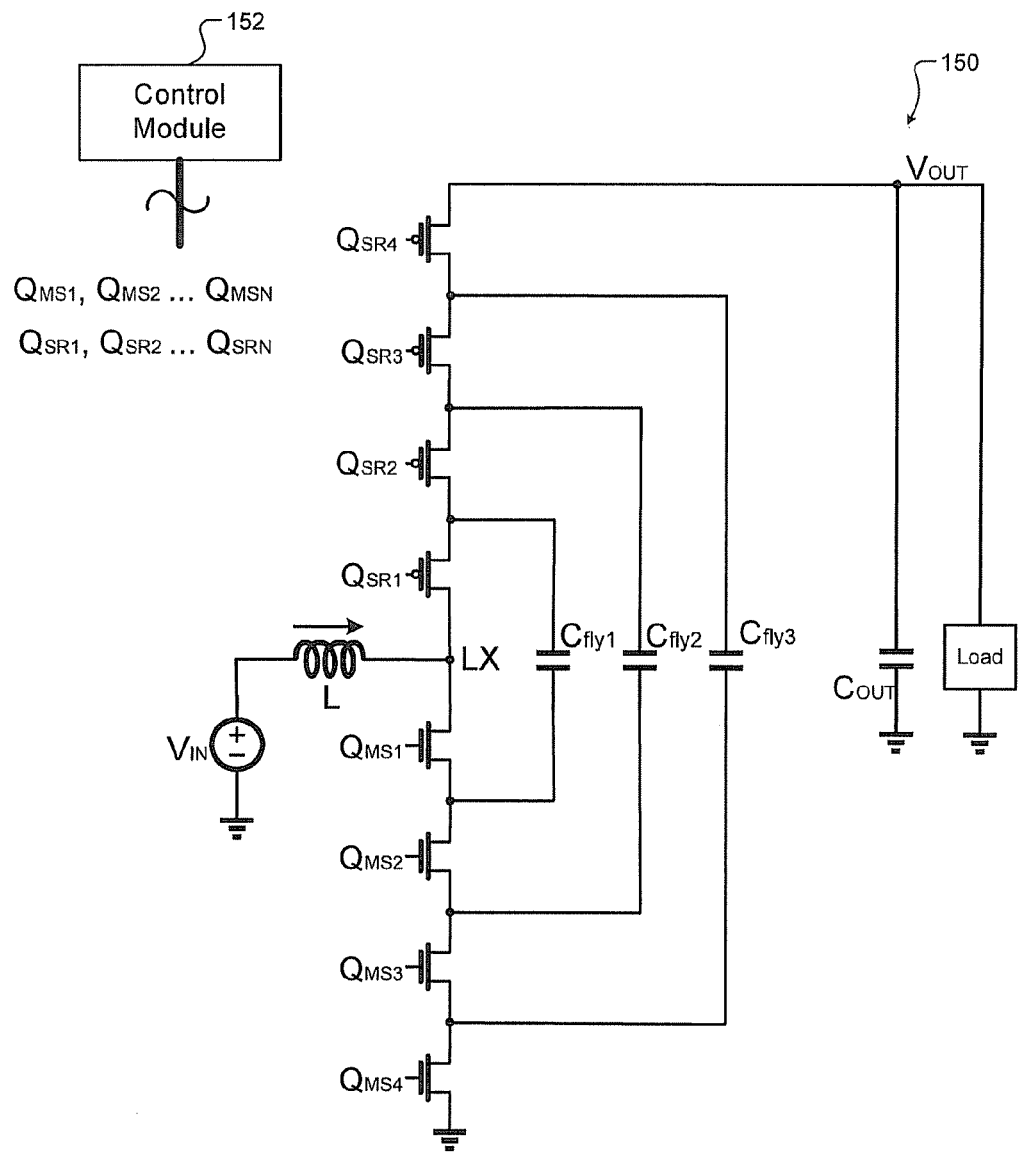
FIG. 7A is an example of a multi-level step-up converter including additional stages.

Referring now to FIG. 7A, an example of a multi-level step-up converter 150 includes a control module 152 to control switching. One or more additional capacitors $C_{fly}$ and transistor pairs $Q_{SR}$ and $Q_{MR}$ and may be added. For example in FIG. 7A, an N-stage step-up converter with N=4 is shown. A pair of transistors $Q_{SR3}$ and $Q_{MS3}$ and a capacitor $C_{fly2}$ are connected in a similar manner. Another pair of transistors $Q_{SR4}$ and $Q_{MS4}$ and a capacitor $C_{fly3}$ are connected in a similar manner. The multi-level step-up converter 150 can be extended to arbitrary number of nested stages. Each additional stage uses low voltage ($V_{OUT}$/N rated) devices, increases effective frequency without increasing switching losses, and reduces voltage ripple applied to the inductor.

Figure 7B:
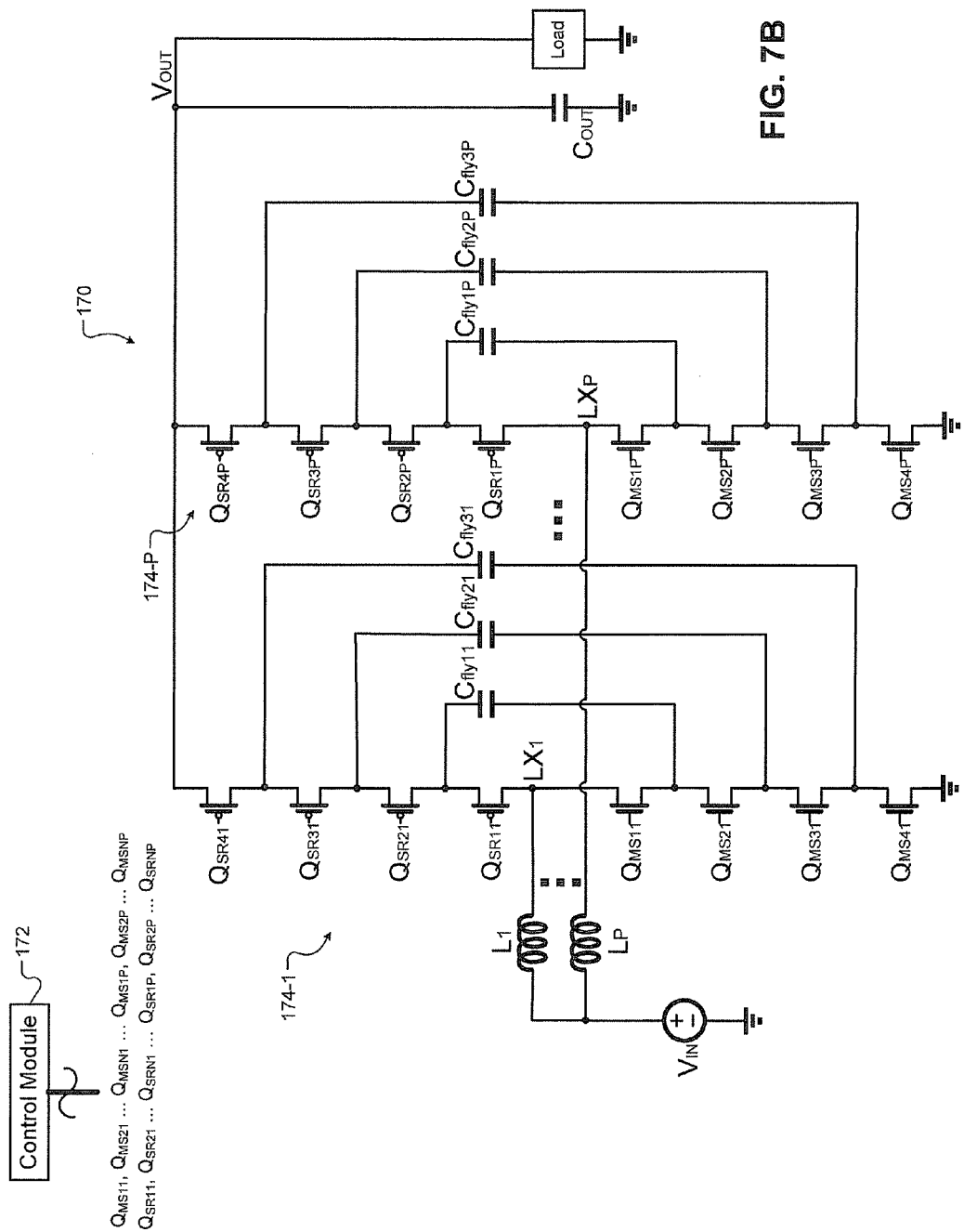
FIGS. 7B-7C show systems including multiple multi-level step-up converters connected to multiple inductors.
Figure 7C:
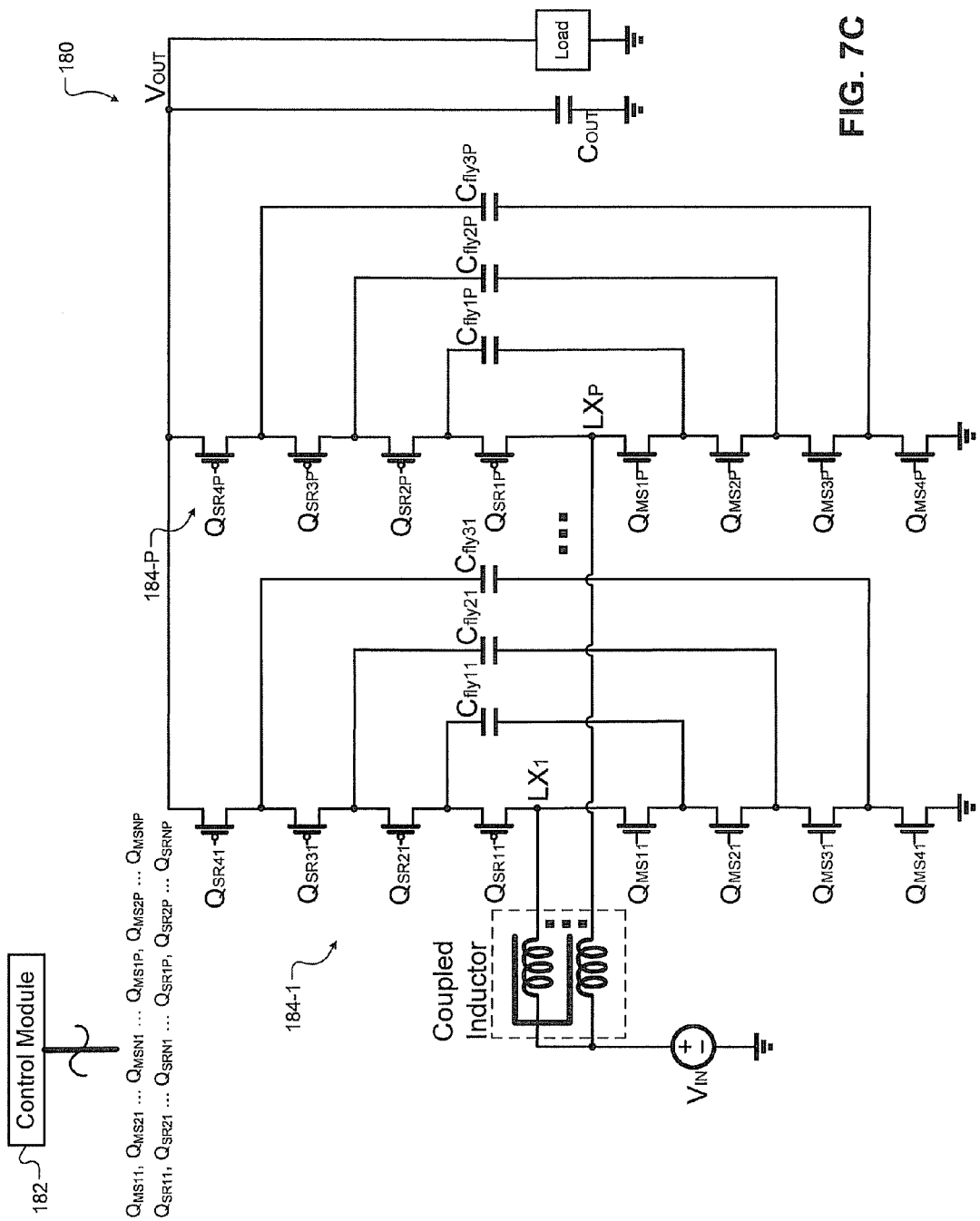

Referring now to FIGS. 7B-7C, systems including first and second step-up converters connected to multiple inductors are shown. In FIG. 7B, a system 170 includes a control module 172 that generates switching signals for P multi-level step-up converters 174-1, . . . , and 174-P that are connected to inductors L1, . . . and LP, respectively, where P is an integer greater than one. Switching sequences created by the control module 172 are analogous to standard multi-phase converters with a phase count of N*P. In FIG. 7C, a system 180 includes a control module 182 that generates switching signals for P multi-level step-up converters 184-1, . . . , and 184-P that are connected to coupled inductor magnetic structure. The coupled inductor magnetic structure may include P windings on a single core, or a multiplicity of magnetic elements such as coupled inductors, transformers and inductors interconnected with each other. Switching sequences created by the control module 182 are analogous to standard multi-phase converters with a phase count of N*P.

The multi-level step-up converter reduces circuit area and passive component profiles, increases converter efficiency and prolongs the run time of battery-powered products. The multi-level step-up converter can be used for large voltage step-up ratios. Example applications include light emitting diodes (WLED) drivers in smart-phones and tablets.

For example only, the multi-level step-up converter may be used to drive a string of light emitting diodes. The multi-level step-up converter includes multiple flying capacitors $C_{fly}$ and an output capacitor $C_{out}$. In the multi-level step-up converter topology, the capacitors $C_{fly}$ are balanced at predetermined ratios of the output voltage. If this is ignored during startup, there can be large current spikes and the capacitors $C_{fly}$ may never come into balance. As a result, switches must be chosen to handle relatively large voltage swings.

Figure 8:
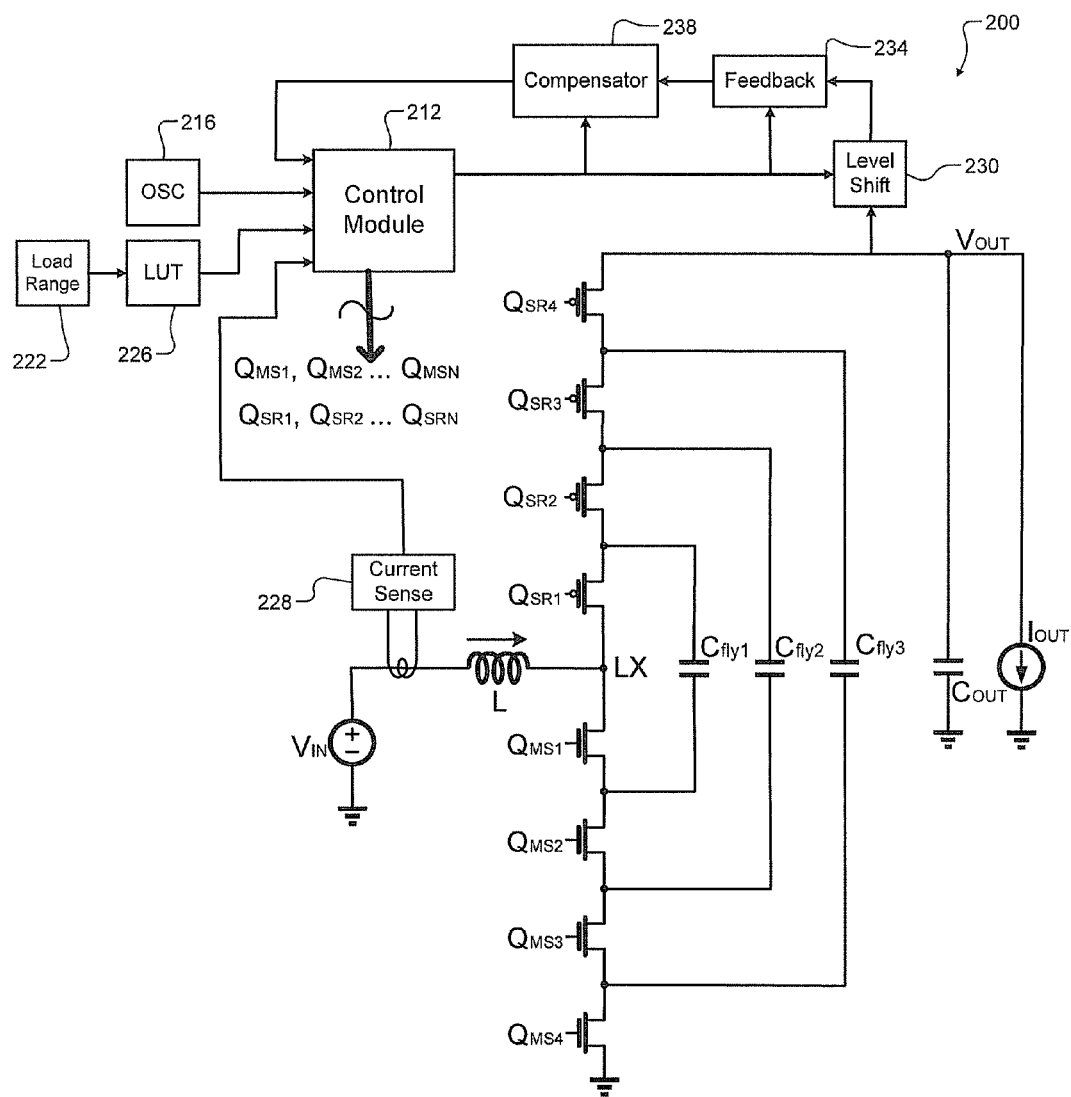
FIG. 8 is an electrical schematic of another example multi-level step-up converter according to the present disclosure.

Referring now to FIG. 8, another example of a multi-level step-up converter 200 is shown to include a control module 212. An oscillator 216 may provide an oscillator signal at a predetermined frequency to the control module 212. The control module 212 may generate clock signals, delayed clock signals, ramp signals, etc. as needed for control based on the oscillator signal. The oscillator frequency may be adjusted or divided in response to the sensed load current, the programmed output voltage or current, or it may be synchronized to an external clock signal.

A load range module 222 may provide a load range signal to a lookup table or other device. The load range signal may be used to specify or determine operating parameters of the multi-level step-up converter. The lookup table (LUT) 226 uses the load range signal to access the lookup table and to provide one or more control parameters to the control module or other circuits. Examples of the control parameters include switching period T, duty cycle D, etc. In some examples, the LUT 226 divides the OSC frequency and outputs T.

A current sensor 228 may be used to determine current through the inductor such as the inductor L. The control module 212 may compare the actual current through the inductor to zero or predetermined non-zero current limits. The control module 212 controls switching of the N transistor pairs.

The control module 212 may incorporate any of the standard control algorithms that are compatible with multi-phase converters. Such algorithms include fixed-frequency duty cycle modulation (voltage mode control), peak or average or valley current mode control, constant on-time or constant off-time, output voltage or inductor current hysteretic, pulse frequency modulation (PFM) or pulse density modulation (PDM). Additionally, light load efficiency techniques such as skip mode and diode emulation may be used.

The control module 212 may also modulate the duty cycles D1 to DN of the N transistor pairs to maintain the desired voltages across the (N−1) capacitors. For example, by way of illustration, in the FIG. 3B, under steady-state operation the voltage on the capacitor $C_{fly}$ is nominally $V_{OUT}/2$. This voltage is maintained by balancing the duration of the charge phase (3) and the discharge phase (1). By sensing the capacitor voltage at a convenient time, for example during phase (3) when the capacitor voltage is ground-referenced, and comparing it to $V_{OUT}/2$, the control module 212 can identify whether the capacitor voltage needs to increase or decrease. During subsequent cycles, the duration of phases (1) and (3) can be skewed by the control module 212 to move the capacitor voltage in the desired direction.

A level shifter 230 generates a level shifted signal based on the output current or voltage. A feedback circuit 234 receives a reference signal such as a target voltage $V_{OUT}$ signal and generates a feedback value based on the level shifted current or voltage. The feedback circuit 234 generates a voltage reference and compares the voltage reference to the output of the level shifter 230. In some examples, the feedback circuit 234 includes a resistive divider to generate an error signal with respect to the target $V_{OUT}$. In other words, the feedback circuit 234 determines the error signal to be minimized by the system.

A compensator 238 compensates the multi-level step-up converter dynamic response. In some examples, the compensator 238 includes a linear or non-linear filter. The compensator 238 ensures system stability. The compensator 238 ensures that system response to changes to the input voltage $V_{IN}$ or the load $I_{OUT}$ is within predetermined specifications.

The LUT 226 may also be used to control one or more parameters of the compensator 238. The LUT 226 may also output parameters to the control module to tune the system to $I_{OUT}$ corresponding to the load range output of the load range module 222. For example, a customer may set the desired $I_{OUT}$ using the load range module 222. In some examples, the load range module 222 may include a dimmer.

Figure 9:
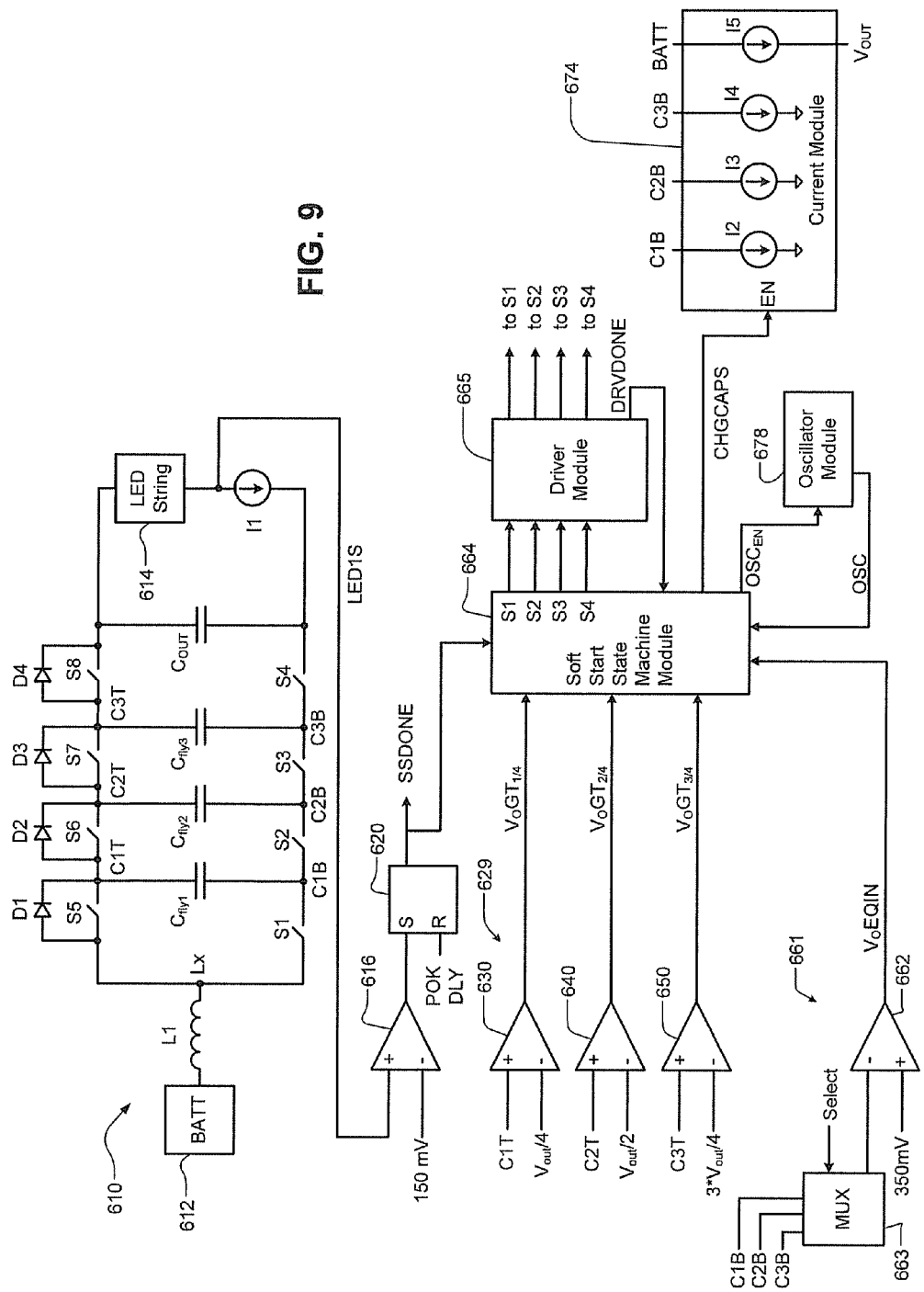
FIG. 9 is a functional block diagram and electrical schematic of an example of a softstart circuit for a multi-level step-up converter according to the present disclosure.

In the following description, a circuit layout for a soft start module according to the present disclosure will be provided initially followed by an operational description. FIG. 9 shows a soft start module 610 for a multi-level, step-up converter 611. A battery 612 is connected to one end of an inductor L1. Another end of the inductor L1 is connected to first terminals of switches S1 and S5. Second terminals of switches S1 and S5 are connected to first terminals of switches S2 and S6, respectively. A first flying capacitor $C_{fly1}$ is connected to the second terminals of switches S1 and S5.

Second terminals of switches S2 and S6 are connected to first terminals of switches S3 and S7, respectively. A second flying capacitor $C_{fly2}$ is connected to the second terminals of switches S2 and S6.

Second terminals of switches S3 and S7 are connected to first terminals of switches S4 and S8, respectively. A third flying capacitor $C_{fly3}$ is connected to the second terminals of switches S3 and S7. An output capacitor $C_{out}$ is connected to the second terminals of the switches S4 and S8.

While diodes D1 to D4 are shown, these diodes are parasitic diodes that are associated with switches S5 to S8, respectively. The diodes D1 to D4 are shown connected across the switches S5 to S8. A load such as a light emitting diode (LED) string 614 includes two or more LEDs (connected together in series or parallel or combinations thereof) and is connected in series to a current source 11. The LED string 614 and the current source 11 are connected in parallel with the output capacitor $C_{out}$.

A node between the LED string 614 and the current source 11 generates an LED1S signal that is connected to a non-inverting input of a comparator 616. An inverting input of the comparator 616 receives a reference potential such as 150 mV. An output of the comparator 616 is input to a set input of an SR flip-flop 620. A reset input of the SR flip-flop 620 receives a signal POKDLY, which is a delayed version of the power OK (POK) signal. An output of the flip-flop 620 generates a soft start done (SSDONE) signal, which is output to a soft start state machine module 664.

The voltages are sensed during charging and compared by a capacitor sensing circuit 629 to predetermined reference potentials. For example, first terminals C1T, C2T, and C3T of capacitors $C_{fly1}$ $C_{fly2}$, and $C_{fly3}$, respectively, are connected to non-inverting inputs of comparators 630, 640 and 650, respectively. First, second and third reference potentials $V_{out}/4$, $V_{out}/2$, and $3*V_{out}/4$ are connected to inverting inputs of the comparators 630, 640 and 650, respectively. Outputs of the comparators 630, 640 and 650 are input the soft start state machine module 664. The soft start state machine module 664 outputs S1, S2, S3 and S4 switch control signals to a switch driver module 665, which drives switching of the switches S1, S2, S3 and S4 based thereon.

The soft start state machine module 664 outputs a CHG-CAPS signal to a current control circuit 674. The current control circuit 674 includes multiple current sources 12, 13, 14 and 15. In some examples, the CHGCAPS signal is used to control switches to enable the current sources 12, 13, 14 and 15. The current sources 12, 13, and 14 pull terminals of the capacitors $C_{fly1}$, $C_{fly2}$, and $C_{fly3}$ low when the CHGCAPS signal is high. The current source 15 drives $V_{out}$ to battery when the CHGCAPS signal is high.

The switch driver module 665 selectively generates a DRVDONE signal when the switches are ready to switch. The DRVDONE signal is output to the soft start state machine module 664. The soft start state machine module 664 outputs an OSCEN signal to an oscillator module 678, which generates the OSC signal.

Another circuit 661 initially charges the capacitors to a predetermined voltage such as the input voltage or another voltage level. An inverting input of a comparator 662 is connected to a multiplexer 663. The multiplexer 663 selectively connects the inverting input of the comparator 662 to the terminal C1B of the capacitor $C_{fly1}$, then to the terminal C2B of the capacitor $C_{fly2}$, and then C3B of the capacitor $C_{fly3}$, A select signal for the multiplexer 663 may be generated by the soft start state machine module 664, the switch driver module 665, a separate logic circuit, or in any other suitable manner. A non-inverting input of the comparator 662 is connected to a reference potential, such as 350 mV. The multiplexer 663 changes the input to the comparator 662 to allow monitoring of $C_{fly1}$ first, then $C_{fly2}$, and then $C_{fly3}$. In some examples, the select signal selects C1B, C2B and C3B during the intervals that the corresponding flying capacitor $C_{fly1}$, $C_{fly2}$, and $C_{fly3}$, respectively, is being charged. An output of the comparator 662 (VOEQIN) is connected to an input of the soft start state machine module 664.

Figure 10:
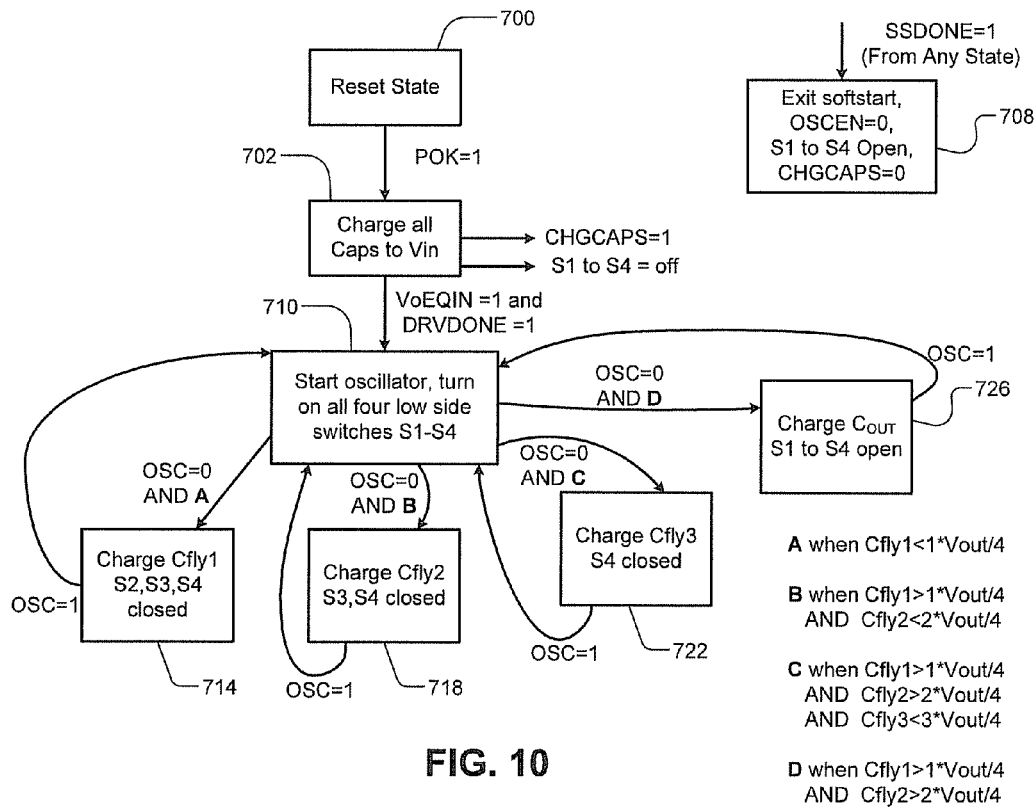
FIG. 10 illustrates an example of a softstart state machine for the step-up converter of FIG. 9.
Figure 11:
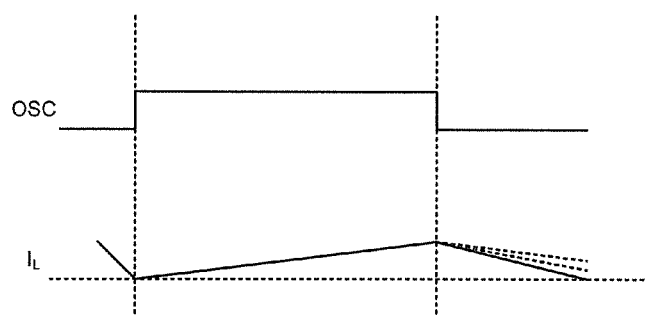
FIGS. 11-13 illustrate various examples of control signals and component signals for the step-up converter illustrated in FIGS. 9 and 10.
Figure 12:
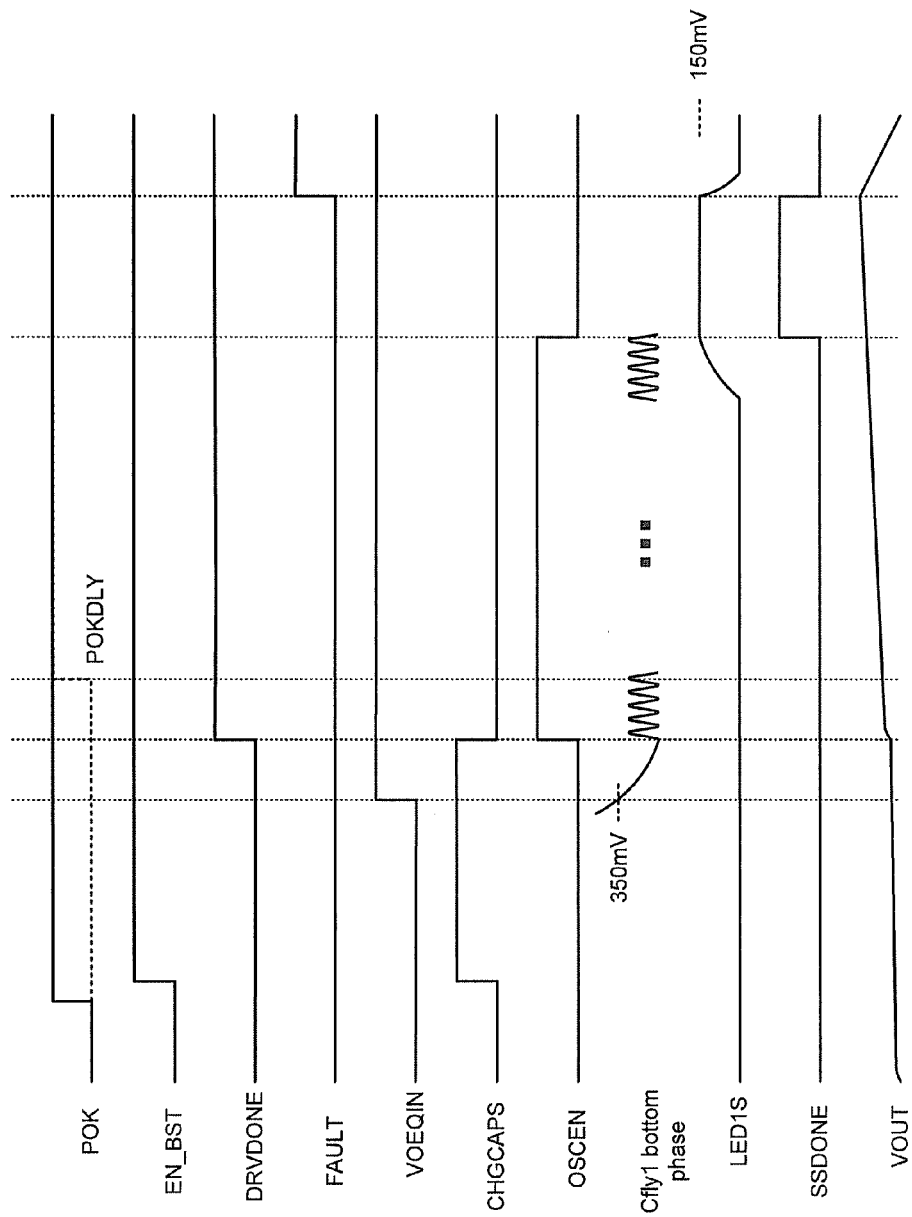
Figure 13:
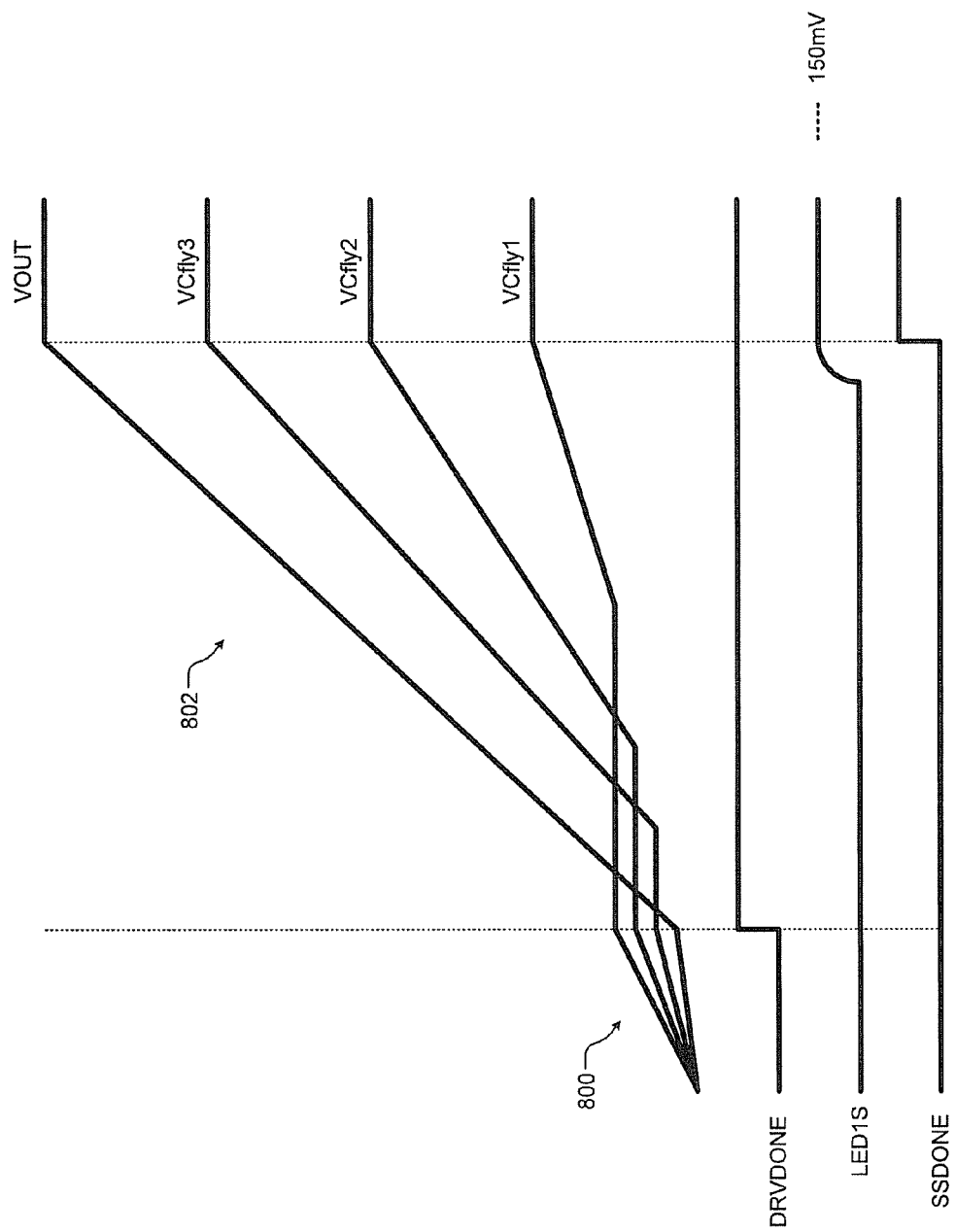

FIG. 10 illustrates operation of the soft start state machine module 664 of FIG. 9. FIGS. 11-13 show signals referenced in the description of FIG. 10. Control remains in a reset state 700 while the POK signal is equal to zero. Control transitions from the reset state 700 to another state 702 when the POK signal is equal to one. In the state 702, control charges the capacitors to the input voltage $V_{IN}$. Control remains in the state 702 when the VOEQIN signal is equal to zero.

Control transitions from any state to state 708 when the SSDONE signal is equal to one. The SSDONE signal is equal to one when the soft start is complete and the circuit is ready for steady state operation of a multi-level step-up converter. In some examples, steady state operation may include operation based on the step-up converter topology described above. In state 708, control exits soft start, sets OSCEN equal to zero, opens switches S1 to S4 and sets the CHGCAPS signal equal to zero.

Control transitions from the state 702 to the state 710 when the VOEQIN signal is equal to one and the DRVDONE signal is equal to one. The VOEQIN signal identifies when all of the flying capacitors have been charged to a predetermined reference potential. The DRVDONE signal identifies when the switches are ready to be switched. At the state 710, control starts the oscillator and turns on the switches S1 to S4.

Control remains in the state 710 when OSC is equal to one. Control transitions from the state 710 to the state 714 when OSC=0 and condition A is true (or A=1). At state 714, control charges the capacitor $C_{fly1}$ and switches S2 to S4 are closed. Control transitions from state 714 back to state 710 when OSC=1.

Conditions A, B, C and D are defined as follows:
A=1 when $C_{fly1} < \frac{1}{4} * V_{out}$,
B=1 when $C_{fly1} > \frac{1}{4} * V_{out}$ and $C_{fly2} < \frac{1}{2} * V_{out}$,
C=1 when $C_{fly1} > \frac{1}{4} * V_{out}$, $C_{fly2} > \frac{1}{2} * V_{out}$ and $C_{fly3} < \frac{3}{4} * V_{out}$, and
D=1 when $C_{fly1} > \frac{1}{4} * V_{out}$, $C_{fly2} > \frac{1}{2} * V_{out}$, and $C_{fly3} > \frac{3}{4} * V_{out}$.

Control transitions from the state 710 to the state 718 when OSC=0 and condition B=1. At state 718, control charges the capacitor $C_{fly2}$ and switches S3 and S4 are closed. Control transitions from state 718 back to state 710 when OSC=1.

Control transitions from the state 710 to the state 722 when OSC=0 and condition C=1. At state 722, control charges the capacitor $C_{fly3}$ and switch S4 is closed. Control transitions from state 722 back to state 710 when OSC=1.

Control transitions from the state 710 to the state 726 when OSC=0 and condition D=1. At state 726, control charges the capacitor $C_{out}$ and switches S1 to S4 are open. Control transitions from state 726 back to state 710 when OSC=1.

In use, the POK (power ok) signal goes high. In response, the switches S1 to S4 are off and the flying capacitors $C_{fly1}$, $C_{fly2}$, and $C_{fly3}$ are charged to $V_{IN}$ (the CHGCAPS signal is set equal to one). The CHGCAPS signal enables the current control circuit 674, which pulls terminals of the flying capacitors $C_{fly1}$, $C_{fly2}$, and $C_{fly3}$ low. The VOEQIN signal is generated when the C1B, C2B, and C3B node at the bottom terminal of the flying capacitor $C_{fly1}$, $C_{fly2}$, and $C_{fly3}$ are less than a predetermined reference potential such as 350 mV.

The switch driver module 665 sets the DRVDONE signal equal to one when the switches S1 to S4 are ready to switch. When both the DRVDONE signal and the VOEQIN signal are equal to one, the soft start state machine module 664 starts the oscillator module 678 (the OSCEN signal is equal to one) and turns on the switches S1 to S4. While the OSC is equal to one, the switches S1 to S4 remain on and the inductor L1 is charged as can be seen in FIG. 11. When the OSC is equal to zero, the soft start state machine module 664 selects one of the states 714, 718, 722 and 726 and charges one of the flying capacitors $C_{fly1}$, $C_{fly2}$, and $C_{fly3}$ or the output capacitor $C_{out}$ depending on the value of voltages at nodes C1T, C2T and C3T, as described above.

The POKDLY signal goes from zero to one a predetermined period after the POK signal is equal to one. The POKDLY signal is input to the SR flip-flop 620. When a signal at a node between the LED string 614 and the current source 11 (the LED1S signal) is greater than a predetermined voltage potential such as 150 mV, the output of the comparator 616 goes high and the SSDONE signal becomes equal to one.

When the SSDONE signal is equal to one, the soft start state machine module 664 exits softstart and sets the OSCEN signal equal to zero. Switches S1 to S4 are open and the CHGCAPS signal is set equal to zero.

In order for a multi-level step-up converter to behave in a well-controlled manner when starting up, voltages of flying capacitors $C_{fly1}$, $C_{fly2}$, and $C_{fly3}$ should be balanced. The soft start module 610 according to the present disclosure charges each of the capacitors ratiometrically to prevent the multi-level step-up converter from having uncontrolled large currents during start up. As used herein, ratiometrically refers to charging the capacitors to a voltage that is a ratio of the output voltage. In some examples, the ratio increases monotonically from a lowest ratio on an inner capacitor to a highest ratio on an outer capacitor. One of the benefits of this approach is the ability to use switches with lower rated voltages.

For example only, the LED string may include 5 LEDs. The voltage drop across the LED string may be 16-18V. The switches can be rated at 4.8V and operated at 4.3V. Therefore, in some examples the voltage rating of the switches is less than 20% higher than the steady state operating voltage. In other examples, the voltage rating of the switches is less than 15% higher than the steady state operating voltage. In other examples, the voltage rating of the switches is less than 12% higher than the steady state operating voltage.

The softstart circuit according to the present disclosure transforms the multi-level step-up converter into a single input, multiple output (SIMO) converter during startup and supplies current pulses to each of the flying capacitors $C_{fly1}$ $C_{fly2}$, and $C_{fly3}$ and the output voltage such that the flying capacitor voltages stay ratio-ed to the output as follows:
$C_{fly1} = \frac{1}{4} * V_{out}$,
$C_{fly2} = \frac{1}{2} * V_{out}$, and
$C_{fly3} = \frac{3}{4} * V_{out}$.

The multi-level step-up converter requires that the capacitors $C_{fly1}$, $C_{fly2}$, and $C_{fly3}$ are balanced at predetermined ratios of the output voltage. If this is ignored during startup, then there can be large current spikes and the capacitors can possibly never come into balance. Also, with the balancing as implemented, smaller, low voltage rated MOSFETs can be used. This reduces the die size and allows improved operating efficiency. Also, the on-time of the multi-level step-up converter is proportional to the battery voltage to keep the peak current in the inductor constant regardless of battery voltage.

The invention charges the inductor to a peak current (500 mA typical) and then dumps that energy into the output, $C_{fly1}$ $C_{fly2}$, and $C_{fly3}$. The energy on each inductor cycle is sent to the capacitor that has the lowest voltage compared to the ideal ratio. This protects the capacitors and power devices in each stage of the step-up converter from going over-voltage during start-up, while charging the capacitors to the desired voltage for steady state operation.

Priority is given to $C_{fly1}$, then to $C_{fly2}$, and then to $C_{fly3}$, and then the output. The ideal ratios of voltages for the three flying caps are as follows:
$C_{fly1} = \frac{1}{4} * V_{out}$,
$C_{fly2} = \frac{1}{2} * V_{out}$, and
$C_{fly3} = \frac{3}{4} * V_{out}$.

While three flying capacitors are shown, two or more flying capacitors can be used. While the present disclosure is described in the context of multi-level step-up converters, the soft start module can be used with other types of converters. The present disclosure can also be extended to any level step-up converter.

As can be appreciated, the on time may be proportional to $V_{IN}$ to keep the inductor current approximately constant. The off time may be proportional to $(V_{OUT}-V_{IN})$.

In FIG. 13, an example of charging of the capacitors $C_{fly}$ is shown. At 800, charging is shown after initial charging to $V_{IN}$. Differences in the voltages at this stage are a result of voltage drops across the diodes. Thereafter, the capacitors $C_{fly}$ are charged ratiometrically as described above. Once charged, the SSDONE signal can be asserted and operation of the multi-level, step-up converter may begin.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A multi-level, step-up converter circuit comprising:
   an inductor including one terminal in communication with an input voltage supply;
   N transistor pairs connected in series, where N is an integer greater than two,
   wherein first and second transistors of a first pair of the N transistor pairs are connected together at a node, and wherein the node is in communication with another terminal of the inductor, and
   wherein third and fourth transistors of a second pair of the N transistor pairs are connected to the first and second transistors, respectively;
   (N−1) capacitors having terminals connected between the N transistor pairs, respectively;
   an output capacitor having a terminal in communication with at least one transistor of the N transistor pairs; and
   a soft start module configured to sequentially charge the (N−1) capacitors to (N−1) fractions of an output voltage, respectively,
   wherein the inductor, the (N−1) capacitors, and N transistor pairs are integrated to create a monolithic converter system.

2. The multi-level, step-up converter of claim 1, further comprising a control module configured to control states of the N transistor pairs.

3. The multi-level, step-up converter of claim 2, wherein the control module is configured to charge the (N−1) capacitors to predetermined levels prior to converter operation.

4. The multi-level, step-up converter of claim 2, wherein the control module controls the states of the N transistor pairs based in part on a duty cycle D and period T.

5. The multi-level, step-up converter of claim 4, wherein the voltages across the (N−1) capacitors are sensed and duty cycles DN of the N transistor pairs are modified to maintain predetermined voltage ratios on the (N−1) capacitors.

6. The multi-level, step-up converter of claim 4, wherein the period T is derived from an external clock signal.

7. The multi-level, step-up converter of claim 4, wherein the period T is modified in response to a programmed output current.

8. The multi-level, step-up converter of claim 4, wherein the period T is modified in response to a sensed output current.

9. The multi-level, step-up converter of claim 2, wherein when operating in a continuous conduction mode with a duty cycle that is less than 50%, the control module is configured to control the states of the first, second, third and fourth transistors, at least one of sequentially and non-sequentially, in:
   a first switching mode in which the first and third transistors are closed and the second and fourth transistors are open;
   a second switching mode in which the first and second transistors are closed and the third and fourth transistors are open;
   a third switching mode in which the second and fourth transistors are closed and the first and third transistors are open; and
   a fourth switching mode in which the first and second transistors are closed and the third and fourth transistors are open.

10. The multi-level, step-up converter of claim 2, wherein when operating in a continuous conduction mode with a duty cycle that is less than 50%, the control module is configured to operate, at least one of sequentially and non-sequentially, in first, second, third and fourth switching modes, and wherein:
    during the first switching mode, current is supplied by at least one of the (N−1) capacitors to a load;
    during the second switching mode, current is supplied by the inductor to the load;
    during the third switching mode, at least one of the (N−1) capacitors is charged; and
    during the fourth switching mode, current is supplied by the inductor to the load.

11. The multi-level, step-up converter of claim 10, wherein the control module is configured to transition:
    from the first switching mode to the second switching mode at D*T;
    from the second switching mode to a third switching mode at T/2;
    from the third switching mode to the fourth switching mode at (½+D)*T; and
    from the fourth switching mode to the first switching mode at T, where T is a period and D is the duty cycle.

12. The multi-level, step-up converter of claim 2, wherein when operating in a continuous conduction mode with a duty cycle that is greater than 50%, the control module is configured to control the states of the first, second, third and fourth transistors, at least one of sequentially and non-sequentially, in:
    a first switching mode in which the first and third transistors are open and the second and fourth transistors are closed;
    a second switching mode in which the second and third transistors are closed and the first and fourth transistors are open;
    a third switching mode in which the first and third transistors are open and the second and fourth transistors are closed; and
    a fourth switching mode in which the first and fourth transistors are closed and the second and third transistors are open.

13. The multi-level, step-up converter of claim 2, wherein when operating in a continuous conduction mode with a duty cycle that is greater than 50%, the control module is configured to operate, at least one of sequentially and non-sequentially, in first, second, third and fourth switching modes, and wherein:
    during the first and third switching modes, current flows to ground;
    during the second switching mode, current is supplied by at least one of the (N−1) capacitors to a load; and
    during the fourth switching mode, at least one of the (N−1) capacitors is charged.

14. The multi-level, step-up converter of claim 13, wherein the control module transitions:
    from the first switching mode to the second switching mode at (D−½)*T;
    from the second switching mode to the third switching mode at T/2;
    from the third switching mode to the fourth switching mode at D*T; and
    from the fourth switching mode to the first switching mode at T, where T is a period and D is the duty cycle.

15. The multi-level, step-up converter of claim 2, wherein when operating in a discontinuous conduction mode with $V_{OUT}/V_{IN}$ that is less than 50%, the control module controls the states of the first, second, third and fourth transistors, at least one of sequentially and non-sequentially, in:
    a first switching mode in which the second and third transistors are closed and the first and fourth transistors are open;
    a second switching mode in which the first and third transistors are closed and the second and fourth transistors are open;
    a third switching mode in which the second, third and fourth transistors are open and the first transistor is open;
    a fourth switching mode in which the first and fourth transistors are closed and the second and third transistors are open;
    a fifth switching mode in which the first and third transistors are closed and the second and fourth transistors are open; and
    a sixth switching mode in which the first, second and fourth transistors are open and the third transistor is open.

16. The multi-level, step-up converter of claim 2, wherein when operating in a discontinuous conduction mode with $V_{OUT}/V_{IN}$ that is less than 50%, the control module operates, at least one of sequentially and non-sequentially, in a first switching mode, a second switching mode, a third switching mode, a fourth switching mode, a fifth switching mode and a sixth switching mode, and wherein:
    during the first switching mode, current is supplied by at least one of the (N−1) capacitors to a load;
    during the second switching mode, current is supplied by the inductor to the load;
    during the third switching mode, current is not supplied to the load or the (N−1) capacitors;
    during the fourth switching mode, at least one of the (N−1) capacitors is charged; and
    during the fifth switching mode, current is supplied by the inductor to the load;
    during the sixth switching mode, current is not supplied to the load or the (N−1) capacitors.

17. The multi-level, step-up converter of claim 16, wherein the control module is configured to transition:
    from the first switching mode to the second switching mode when current is equal to a predetermined current;
    from the second switching mode to the third switching mode when current is zero;
    from the third switching mode to the fourth switching mode at T/2;
    from the fourth switching mode to the fifth switching mode when current is equal to a predetermined current;
    from the fifth switching mode to the sixth switching mode when current is zero; and
    from the sixth switching mode to the first switching mode at T, where T is a period and D is a duty cycle.

18. The multi-level, step-up converter of claim 2, wherein when operating in a discontinuous conduction mode with $V_{OUT}/V_{IN}$ that is greater than 50%, the control module is configured to control the states of the first, second, third and fourth transistors, at least one of sequentially and non-sequentially, in:
    a first switching mode in which the first and third transistors are open and the second and fourth transistors are closed;
    a second switching mode in which the second and third transistors are closed and the first and fourth transistors are open;
    a third switching mode in which the first, third and fourth transistors are open and the second transistor is closed;

a fourth switching mode in which the first and third transistors are open and the second and fourth transistors are closed;

a fifth switching mode in which the first and fourth transistors are closed and the second and third transistors are open; and a sixth switching mode in which the first, second and third transistors are open and the fourth transistor is closed.

19. The multi-level, step-up converter of claim 2, wherein when operating in a discontinuous conduction mode with $V_{OUT}/V_{IN}$ that is greater than 50%, the control module is configured to operate, at least one of sequentially and non-sequentially, in a first switching mode, a second switching mode, a third switching mode, a fourth switching mode, a fifth switching mode and a sixth switching mode, and wherein:

during the first and fourth switching modes, current flows to ground;

during the second switching mode, current is supplied by at least one of the (N−1) capacitors to a load;

during the fifth switching mode, at least one of the (N−1) capacitors is charged; and during the third and sixth switching modes, current is not supplied to the load or the (N−1) capacitors.

20. The multi-level, step-up converter of claim 19, wherein the control module is configured to transition:

from the first switching mode to the second switching mode when current is equal to a predetermined current;

from the second switching mode to the third switching mode when current is zero;

from the third switching mode to the fourth switching mode at T/2;

from the fourth switching mode to the fifth switching mode when current is equal to the predetermined current;

from the fifth switching mode to the sixth switching mode when current is zero; and from the sixth switching mode to the first switching mode at T, where T is a period and D is a duty cycle.

21. The multi-level, step-up converter of claim 2, further comprising a current sensor that communicates with the control module and is configured to sense current supplied by the inductor.

22. The multi-level, step-up converter of claim 21, wherein the inductor current is sensed as a voltage across one or more of the N transistor pairs.

23. The multi-level, step-up converter of claim 21, wherein the control module transitions between switching modes of the N transistor pairs based on a duty cycle, a period and current supplied by the inductor current.

24. The multi-level, step-up converter of claim 2, wherein the control module controls the states of the N transistor pairs using at least one of fixed-frequency duty cycle modulation using voltage mode control, peak current mode control, average current mode control, valley current mode control, constant on-time, constant off-time, output voltage, inductor current hysteretic, pulse frequency modulation (PFM) or pulse density modulation.

25. The multi-level, step-up converter of claim 2, wherein the control module transitions between switching modes of the N transistor pairs based on inductor current at least one of exceeding a current limit and being equal to zero.

26. The multi-level, step-up converter circuit of claim 1, wherein the soft start module is configured to sequentially:

charge a first one of the (N−1) capacitors to 1/N of an output voltage;

charge a second one of the (N−1) capacitors to 2/N of the output voltage; and charge an $(N-1)^{th}$ one of the (N−1) capacitors to (N−1)/N of the output voltage.

27. The multi-level, step-up converter circuit of claim 26, wherein the soft start module is configured to initially charge the (N−1) capacitors to the input voltage before charging the (N−1) capacitors to predetermined values.

28. A system comprising:

P multi-level, step-up converter circuits as recited in claim 1, where P is an integer greater than one; and a control module configured to control states of the P multi-level, step-up converter circuits.

29. A system comprising:

P multi-level, step-up converters as recited in claim 1, where P is an integer greater than one;

where at an inductor node for at least two of the P multi-level, step-up converters and an output capacitor node for at least two of the P multi-level, step-up converters are in communication, respectively; and a control module configured to control states of the P multi-level, step-up converters.

30. The system of claim 29, wherein inductors of two of the P multi-level, step-up converters are magnetically coupled by a magnetic component.

31. The multi-level, step-up converter of claim 30, wherein the magnetic component and one or more of the N transistor pairs are integrated on a single substrate.

32. The multi-level, step-up converter of claim 1, wherein one or more of the N transistor pairs are integrated on a single substrate.

33. The multi-level, step-up converter of claim 1, wherein one or more of the (N−1) capacitors connected between the N transistor pairs are integrated on a single substrate.

34. The multi-level, step-up converter of claim 1, wherein one or more of the (N−1) capacitors and one or more of the N transistor pairs are integrated on a single substrate.

35. The multi-level, step-up converter of claim 1, wherein the inductor and one or more of the N transistor pairs are integrated on a single substrate.

36. A multi-level, step-up converter circuit comprising:

an inductor including one terminal in communication with an input voltage supply;

N transistor pairs connected in series, where N is an integer greater than one, wherein first and second transistors of a first pair of the N transistor pairs are connected together at a node, and wherein the node is in communication with another terminal of the inductor, and wherein third and fourth transistors of a second pair of the N transistor pairs are connected to the first and second transistors, respectively;

(N−1) capacitors having terminals connected between the N transistor pairs, respectively;

an output capacitor having a terminal in communication with at least one transistor of the N transistor pairs; and a soft start module including:

a driver module configured to generate a first signal when the N transistor pairs are ready to switch;

a first charging circuit configured to charge the (N−1) capacitors to the input voltage and to generate a second signal; and a second charging circuit configured to sequentially charge the (N−1) capacitors to (N−1) fractions of an output voltage, respectively, in response to the first signal and the second signal being generated.

37. The multi-level, step-up converter circuit of claim 36, wherein the second charging circuit charges an (N−1)th one of the (N−1) capacitors to (N−1)/N of an output voltage.

38. A multi-level, step-up converter circuit comprising:
- an inductor including one terminal in communication with an input voltage supply;
- N transistor pairs connected in series, where N is an integer greater than two,
- wherein first and second transistors of a first pair of the N transistor pairs are connected together at a node, and wherein the node is in communication with another terminal of the inductor, and
- wherein third and fourth transistors of a second pair of the N transistor pairs are connected to the first and second transistors, respectively;
- (N−1) capacitors having terminals connected between the N transistor pairs, respectively;
- an output capacitor having a terminal in communication with at least one transistor of the N transistor pairs; and
- a soft start module configured to charge the (N−1) capacitors to voltages that are ratios of an output voltage,
- wherein the ratios increase monotonically from a lowest ratio on an inner capacitor of the (N−1) capacitors to a highest ratio on an outer capacitor of the (N−1) capacitors.

* * * * *

UNITED STATES PATENT AND TRADEMARK OFFICE
CERTIFICATE OF CORRECTION

PATENT NO. : 9,653,986 B2  
APPLICATION NO. : 14/212062  
DATED : May 16, 2017  
INVENTOR(S) : Serhii Mikhailovich Zhak et al.

Page 1 of 1

It is certified that error appears in the above-identified patent and that said Letters Patent is hereby corrected as shown below:

In the Specification

| | |
|---|---|
| Column 11, Line 19 | Delete "C" and insert -- $C_{fly}$ -- |
| Column 11, Line 28-29 | Delete "$V_{OUT}V_{IN} > 50\%$" and insert -- $V_{OUT}/V_{IN} > 50\%$ -- |
| Column 13, Line 63 | Delete "11" and insert -- I1 -- |
| Column 13, Line 64 | Delete "11" and insert -- I1 -- |
| Column 13, Line 67 | Delete "11" and insert -- I1 -- |
| Column 14, Line 12 | After "$C_{fly1}$", insert -- , -- |
| Column 14, Line 24-25 | Delete "12, 13, 14 and 15" and insert -- I2, I3, I4 and I5 -- |
| Column 14, Line 26-27 | Delete "12, 13, 14 and 15" and insert -- I2, I3, I4 and I5 -- |
| Column 14, Line 27 | Delete "12, 13, 14 and 15" and insert -- I2, I3, I4 and I5 -- |
| Column 14, Line 29 | Delete "15" and insert -- I5 -- |
| Column 14, Line 44 | Delete "$C_{fly3}$," and insert -- $C_{fly3}$. -- |
| Column 16, Line 1 | Delete "11" and insert -- I1 -- |
| Column 16, Line 34 | After "$C_{fly1}$", insert -- , -- |
| Column 16, Line 52 | After "$C_{fly1}$", insert -- , -- |

Signed and Sealed this  
Thirteenth Day of February, 2018

Andrei Iancu  
*Director of the United States Patent and Trademark Office*